US010574925B2

(12) United States Patent
Otaka

(10) Patent No.: US 10,574,925 B2
(45) Date of Patent: Feb. 25, 2020

(54) SOLID-STATE IMAGING DEVICE, METHOD FOR DRIVING SOLID-STATE IMAGING DEVICE, AND ELECTRONIC APPARATUS

(71) Applicant: Brillnics Inc., Grand Cayman (KY)

(72) Inventor: Toshinori Otaka, Tokyo (JP)

(73) Assignee: BRILLNICS INC., Grand Cayman (KY)

( * ) Notice: Subject to any disclaimer, the term of this patent is extended or adjusted under 35 U.S.C. 154(b) by 0 days.

(21) Appl. No.: 16/164,492

(22) Filed: Oct. 18, 2018

(65) Prior Publication Data
US 2019/0124285 A1 Apr. 25, 2019

(30) Foreign Application Priority Data
Oct. 20, 2017 (JP) ................................. 2017-203676

(51) Int. Cl.
H04N 5/378 (2011.01)
H04N 5/355 (2011.01)

(52) U.S. Cl.
CPC ........... H04N 5/378 (2013.01); H04N 5/3559 (2013.01)

(58) Field of Classification Search
CPC ...... H04N 5/378; H04N 5/3559; H04N 5/379; H04N 3/1562; H04N 5/2355; H04N 5/35527; H04N 5/3591; H04N 5/361; H04N 5/37452; H04N 5/37455
See application file for complete search history.

(56) References Cited

U.S. PATENT DOCUMENTS

| 7,164,114 | B2 | 1/2007 | Lai et al. |
| 8,553,122 | B2 | 10/2013 | Nitta et al. |
| 9,313,435 | B2 | 4/2016 | Nitta et al. |
| 9,769,411 | B2 | 9/2017 | Nitta et al. |
| 2006/0170803 | A1* | 8/2006 | Lim ........................ H04N 5/243 348/308 |
| 2010/0181464 | A1 | 7/2010 | Veeder |
| 2011/0199526 | A1 | 8/2011 | Nitta et al. |

(Continued)

FOREIGN PATENT DOCUMENTS

JP 2005-278135 A 10/2005
JP 2005-295346 A 10/2005

Primary Examiner — Sinh Tran
Assistant Examiner — Zhenzhen Wu
(74) Attorney, Agent, or Firm — Westerman, Hattori, Daniels & Adrian, LLP

(57) ABSTRACT

A comparator in an AD conversion part, under the control of a reading part, performs a first comparison processing outputting a digitized first comparison result signal with respect to a voltage signal corresponding to an overflow charge overflowing from a photodiode PD1 to FD1 in an integration period and performs a second comparison processing outputting a digitized second comparison result signal with respect to a voltage signal corresponding to an accumulated charge of the photodiode PD1 transferred to the FD1 after a transfer period after the integration period, and a signal processing part performs combinational processing applying FWC information and joining a first AD conversion transfer curve TC1 corresponding to the first comparison processing and a second AD conversion transfer curve TC2 corresponding to the second comparison processing. Thus, it is possible to smoothly switch (connect) a plurality of signals to be combined and to suppress deterioration of an image.

20 Claims, 30 Drawing Sheets

(56) References Cited

U.S. PATENT DOCUMENTS

| | | |
|---|---|---|
| 2014/0285697 A1 | 9/2014 | Nitta et al. |
| 2016/0295145 A1 | 10/2016 | Nitta et al. |
| 2018/0098037 A1* | 4/2018 | Kumaki .............. H03M 1/0658 |
| 2019/0132539 A1* | 5/2019 | Otaka ................ H01L 27/14612 |
| 2019/0141270 A1* | 5/2019 | Otaka .................... H04N 5/378 |

* cited by examiner

Light to time conversion plot at various reference voltage at comparator input

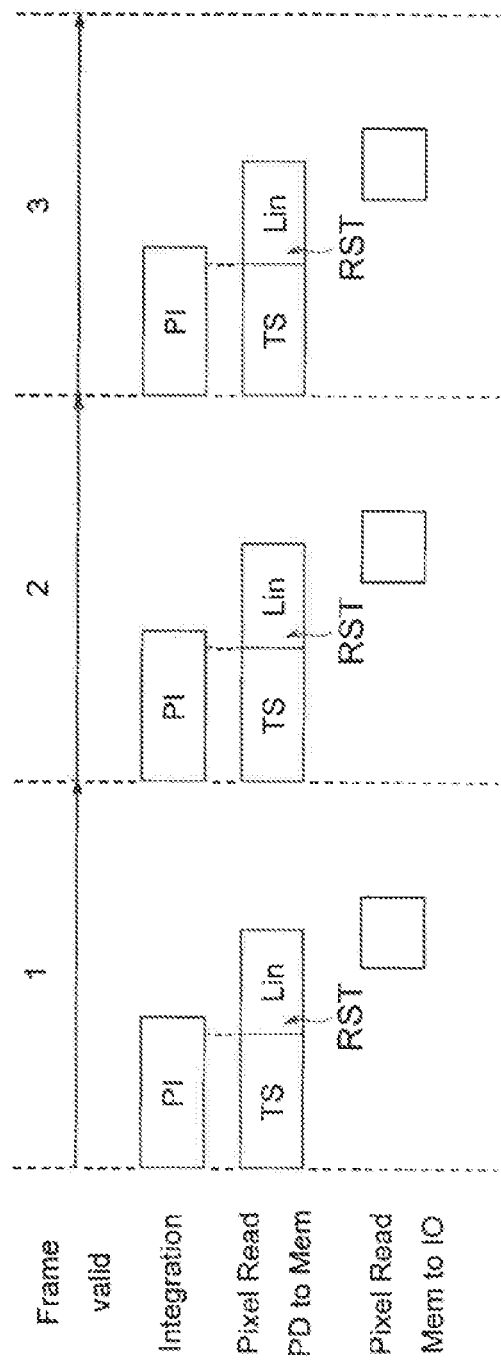

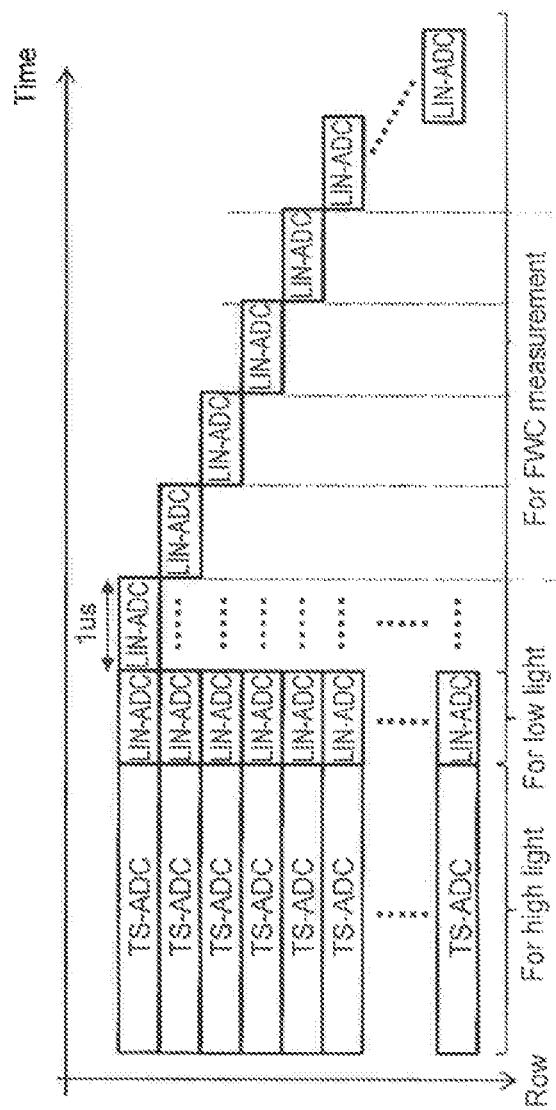
FIG. 11A
FIG. 11B
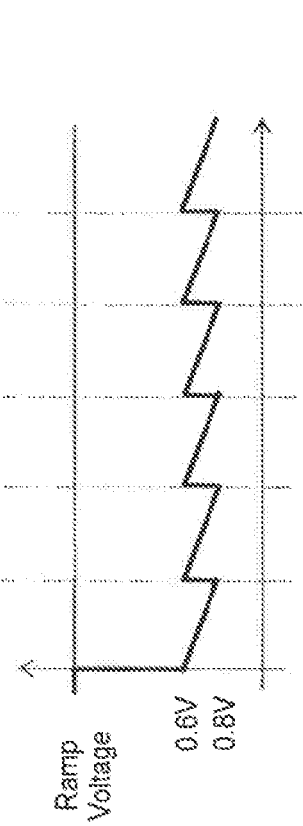
FIG. 11C

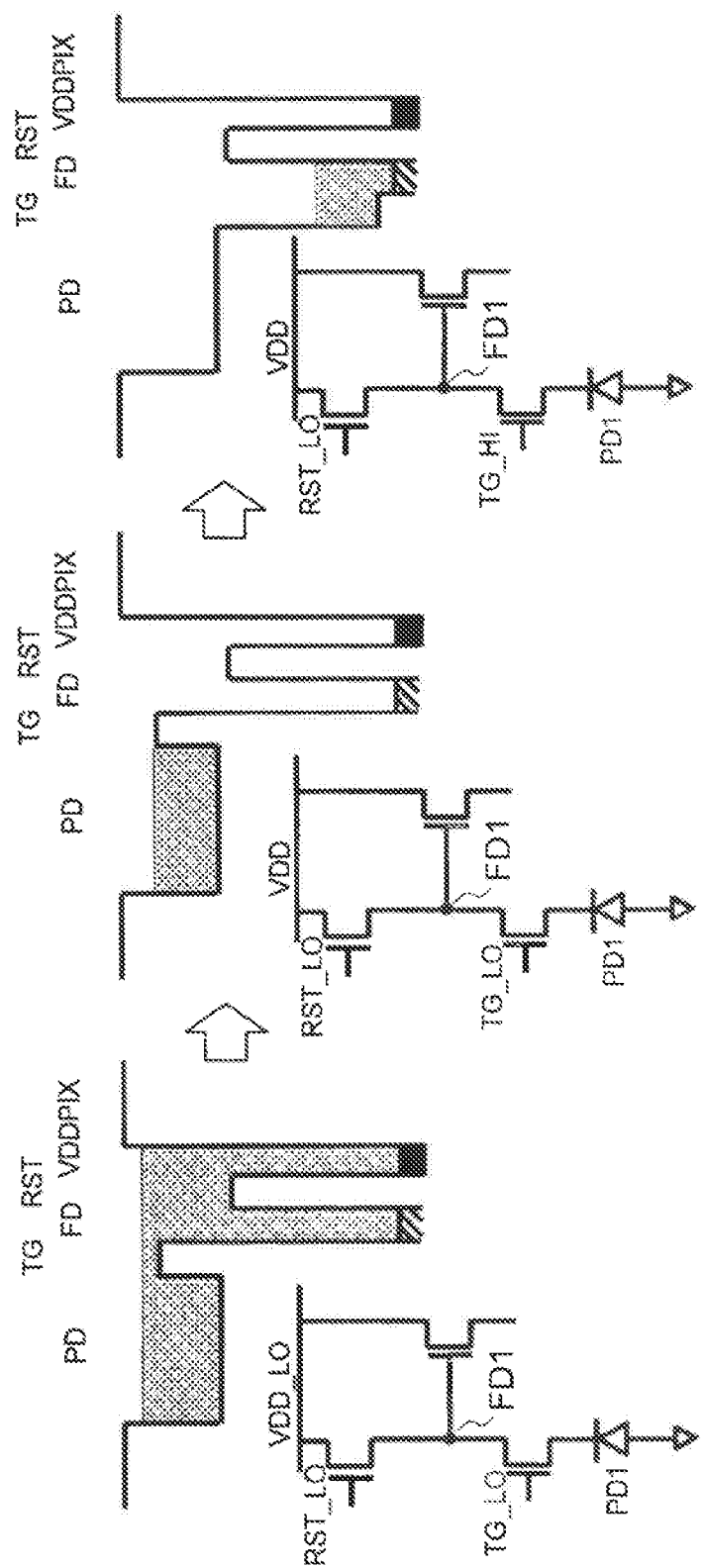

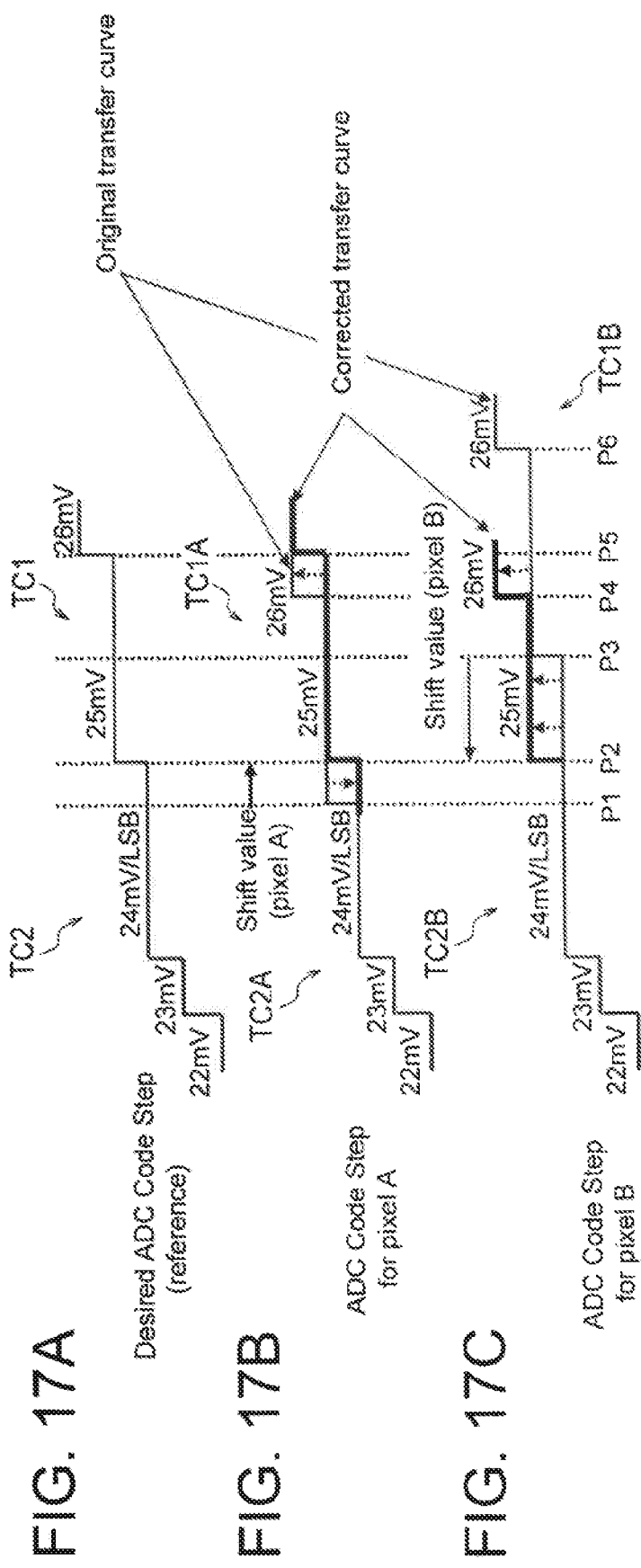

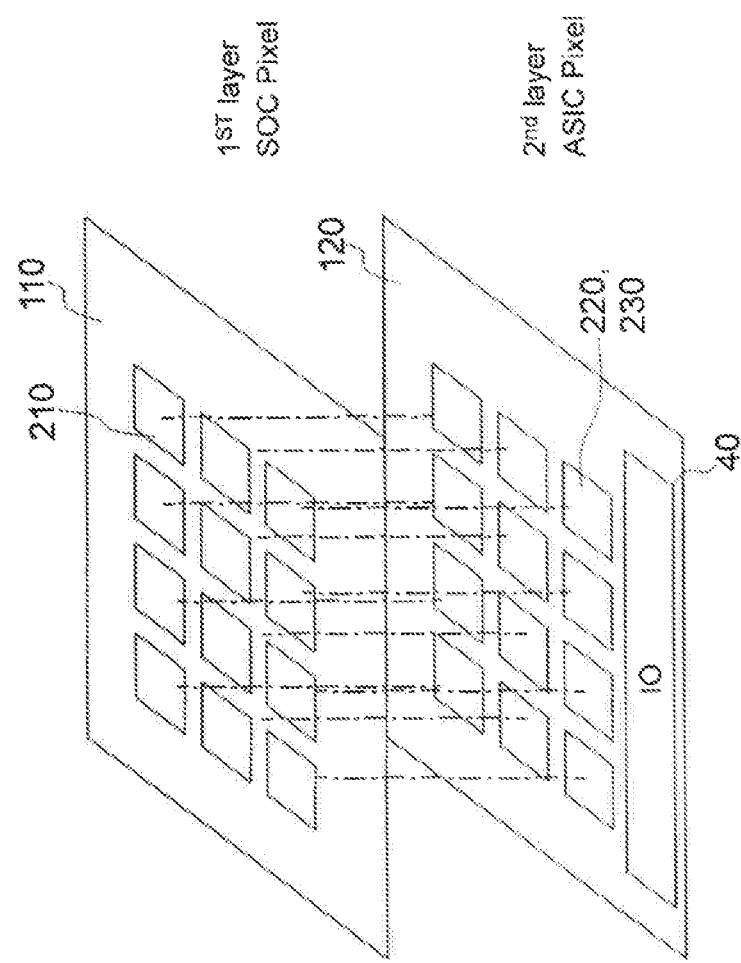
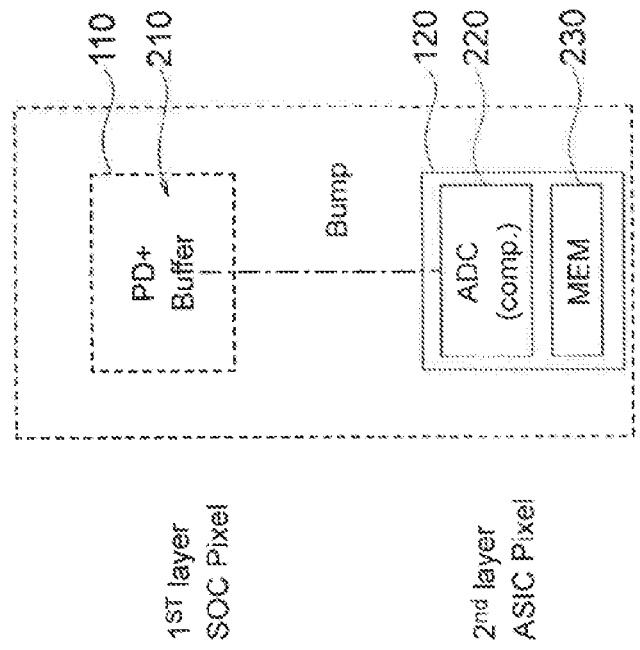
FIG. 21A
FIG. 21B

Read out timing example

An example of time to flip sequence.
(ramped reference voltage)

An example of light – digital code plot.
15n sampling for 256 code (3usec integration time)
150uV/e with linear ramped reference voltage (10mV – 800mV)

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

The present invention contains subject matter related to Japanese Patent Application JP 2017-203076 filed in the Japan Patent Office on Oct. 20, 2017, the entire contents of which being incorporated herein by reference.

TECHNICAL FIELD

The present invention relates to a solid-state imaging device, a method for driving a solid-state imaging device, and an electronic apparatus.

BACKGROUND ART

As solid-state imaging devices (image sensors) using photoelectric conversion elements detecting light and generating a charge, CMOS (complementary metal oxide semiconductor) image sensors have been put into practical use. CMOS image sensors have been widely applied as parts of digital cameras, video cameras, monitoring cameras, medical endoscopes, personal computers (PC), mobile phones and other portable terminals (mobile devices) and other various types of electronic apparatuses.

A CMOS image sensor has a floating diffusion (FD) amplifier having a photodiode (photoelectric conversion element) and an FD layer (FD) for each pixel. Reading is performed by selecting a certain row in a pixel array and simultaneously reading out the pixels in a column direction, that is, a column parallel output type is the mainstream.

Further, various circuits have been proposed for the pixel signal read-out (output) circuit of a column parallel output type CMOS image sensor. Among them, one of the most advanced circuits is a circuit which is provided with an analog-to-digital converter (ADC) for each column and extracts pixel signals as digital signals (for example, see Japanese Patent Publication No. 2005-278135 and Japanese Patent Publication No. 2005-295346).

In this column parallel ADC-mounting CMOS image sensor (column AD system CMOS image sensor), a comparator compares a so-called RAMP wave and the pixel signals and performs digital CDS by a later stage counter to thereby perform AD conversion.

In this type of CMOS image sensor, however, while high speed transfer of signals is possible, there is the disadvantage that a global shutter reading operation cannot be carried out.

Contrary to this, a digital pixel sensor in which an ADC including a comparator (and further a memory part) is arranged in each pixel to also enable realization of a global shutter for executing the start of exposure and end of exposure at the same timings with respect to all pixels in the pixel array has been proposed (for example, see U.S. Pat. No. 7,164,114, B2, FIG. 4 and US Patent No. 2010/0181464, A1).

Technical Problem

In this regard, however, in the CMOS image sensors provided with the conventional digital pixel sensors explained above, it is possible to realize a global shutter function, but for example charges overflowing from the photodiodes in the integration period are not utilized in real time, therefore there is a limit to achievement of a broader dynamic range and higher frame rate.

Further, important performance indexes of CMOS image sensors include random noise. It is known that the main sources of random noise are the pixels and AD converters. In general, as techniques for reducing random noise, the methods are known of enlarging the transistor size to reduce flicker noise or of adding a capacity to the output of the comparator and lowering the bandwidth to thereby aim at a filter effect of noise by CDS. However, in each technique, there are disadvantages such as an increase in area, degradation of inversion delay of the comparator due to the increase of capacity, and the frame rate of the imaging element not being able to be raised.

Further, since an ADC (further a memory part) including a comparator is arranged in each pixel, it is difficult to expand the effective pixel region to the maximum limit and is difficult to maximize the value relative to the cost.

Further, as methods for expanding the dynamic range, for example, the method of reading out two types of signals which are different in integration period from the same pixel in the image sensor and combining these two types of signals to thereby expand the dynamic range, the method of combining a signal having a small dynamic range in a pixel of a high sensitivity and a signal expanded in the dynamic range at a low sensitivity and to expand the dynamic range, etc. are known.

In this regard, in all of the methods, the plurality of signals to be combined must be almost equally maintained in linearity of output voltage with respect to quantities of incident light (illumination) in the vicinity of the signal values for which combination (switching of signals) is carried out. The signals are designed so that the gains with respect to the quantities of light (illumination) differ in order to expand the dynamic range (D range), therefore the practice is mainly to correct the gains in the digital signal processing circuits after digital conversion in the analog-to-digital converters (ADC) so that the linearities (or inclinations) are maintained the same.

However, there are variations in units of individual specimens of solid-state imaging devices, variations among the pixels within individual specimens, etc. Therefore, even if switching signals by numerical values corrected based on the parameter of the center value of the variation, sometimes the linearity in the vicinity of that level is not always guaranteed. When the precision of correction is low (varies) in this way, there are the disadvantages that smooth switching becomes impossible, discontinuous points become noise, and this becomes a cause of so-called tone jump or other image deterioration.

SUMMARY

The present invention provides a solid-state imaging device capable of smoothly switching (connecting) a plurality of signals to be combined and capable of suppressing deterioration of an image while substantially realizing a broader dynamic range and a higher frame rate, a method for driving such a solid-state imaging device, and an electronic apparatus. Further, the present invention provides a solid-state imaging device capable of smoothly switching (connecting) a plurality of signals to be combined, capable of suppressing deterioration of an image while substantially realizing a broader dynamic range and a higher frame rate, and in addition capable of lowering noise, capable of expanding the effective pixel region to the maximum limit, and capable of raising the value relative to the cost to the maximum limit, a method for driving such a solid-state imaging device, and an electronic apparatus.

Solution to Problem

A solid-state imaging device of a first aspect of the present invention has a pixel part in which pixels for performing photoelectric conversion are arranged, a reading part which reads out pixel signals from the pixels in the pixel part, and a signal processing part which combines a plurality of read-out signals to generates a combined signal expanded in dynamic range, wherein each pixel includes a photoelectric conversion element which accumulates a charge generated by photoelectric conversion in an integration period, a transfer element capable of transferring the charge accumulated in the photoelectric conversion element in a transfer period after the integration period, an output node to which the charge accumulated in the photoelectric conversion element is transferred through the transfer element, an output buffer part which converts the charge at the output node to a voltage signal corresponding to a quantity of the charge and outputs the converted voltage signal, and a comparator which performs comparison processing comparing the voltage signals of the output buffer part and a reference voltage and outputting the digitized comparison result signal, the comparator, under the control of the reading part, performs a first comparison processing outputting a digitized first comparison result signal with respect to a voltage signal corresponding to the overflow charge overflowing from the photoelectric conversion element to the output node in the integration period and a second comparison processing outputting a digitized second comparison result signal with respect to the voltage signal corresponding to the accumulated charge of the photoelectric conversion element transferred to the output node in the transfer period after the integration period, and the signal processing part performs combinational processing joining a first analog-to-digital (AD) conversion transfer curve corresponding to the first comparison processing and a second AD conversion transfer curve corresponding to the second comparison processing.

A second aspect of the present invention is a method for driving a solid-state imaging device having a pixel part in which pixels for performing photoelectric conversion are arranged, a reading part which reads out the pixel signals from the pixels in the pixel part, and a signal processing part which combines a plurality of read-out signals to generate a combined signal expanded in the dynamic range, wherein each pixel includes a photoelectric conversion element which accumulates a charge generated by photoelectric conversion in an integration period, a transfer element capable of transferring the charge accumulated in the photoelectric conversion element in a transfer period after the integration period, an output node to which the charge accumulated in the photoelectric conversion element is transferred through the transfer element, an output buffer part which converts the charge at the output node to a voltage signal corresponding to a quantity of the charge and outputs the converted voltage signal, and a comparator which performs comparison processing comparing the voltage signals of the output buffer part and a reference voltage and outputting the digitized comparison result signal, comprising, when reading out the pixel signals of the pixels, having the comparator, under the control of the reading part, perform a first comparison processing outputting a digitized first comparison result signal with respect to the voltage signal corresponding to an overflow charge overflowing from the photoelectric conversion element to the output node in the integration period and perform a second comparison processing outputting a digitized second comparison result signal with respect to the voltage signal corresponding to the accumulated charge of the photoelectric conversion element transferred to the output node in the transfer period after the integration period and having the signal processing part perform combinational processing joining a first analog-to-digital (AD) conversion transfer curve corresponding to the first comparison processing and a second AD conversion transfer curve corresponding to the second comparison processing.

An electronic apparatus of a third aspect of the present invention has a solid-state imaging device and an optical system for forming a subject image in the solid-state imaging device, wherein the solid-state imaging device has a pixel part in which pixels for performing photoelectric conversion are arranged, a reading part which reads out pixel signals from the pixels in the pixel part, and a signal processing part which combines a plurality of read-out signals to generate a combined signal expanded in the dynamic range, each pixel includes a photoelectric conversion element which accumulates a charge generated by photoelectric conversion in an integration period, a transfer element capable of transferring the charge accumulated in the photoelectric conversion element in a transfer period after the integration period, an output node to which the charge accumulated in the photoelectric conversion element is transferred through the transfer element, an output buffer part which converts the charge at the output node to a voltage signal corresponding to a quantity of the charge and outputs the converted voltage signal, and a comparator which performs comparison processing comparing the voltage signals of the output buffer part and the reference voltage and outputting the digitized comparison result signal, the comparator, under the control of the reading part, performs a first comparison processing outputting a digitized first comparison result signal with respect to a voltage signal corresponding to the overflow charge overflowing from the photoelectric conversion element to the output node in the integration period and performs a second comparison processing outputting a digitized second comparison result signal with respect to the voltage signal corresponding to the accumulated charge of the photoelectric conversion element transferred to the output node in the transfer period after the integration period, and the signal processing part performs combinational processing joining a first analog-to-digital (AD) conversion transfer curve corresponding to the first comparison processing and a second AD conversion transfer curve corresponding to the second comparison processing.

Advantageous Effects of Invention

According to the present invention, smooth switching (connection) of a plurality of signals to be combined is possible and it becomes possible to suppress deterioration of an image while substantially realizing a broader dynamic range and a higher frame rate. Further, according to the present invention, smooth switching (connection) of a plurality of signals to be combined is possible and it becomes possible to suppress deterioration of an image while substantially realizing a broader dynamic range and a higher frame rate and, in addition, is possible to lower noise and expand the effective image region to the maximum limit and possible to raise the value relative to the cost to the maximum limit.

BRIEF DESCRIPTION OF DRAWINGS

FIG. 10 is a view showing an example of a frame read out sequence in the solid-state imaging device according to the first embodiment of the present invention.

FIG. 11A to FIG. 11C are views for explaining a first measurement method for measuring FWC information of the solid-state imaging device according to the embodiment on-line.

FIG. 12A to FIG. 12C are views for explaining a second measurement method for measuring FWC information of the solid-state imaging device according to the embodiment off-line.

FIG. 17A to FIG. 17C are views showing an example of a digital-to-digital re-conversion processing according to an embodiment of the present invention.

FIG. 21A and FIG. 21B are schematic views for explaining the stacked structure of the solid-state imaging device according to the first embodiment.

DESCRIPTION OF EMBODIMENTS

Embodiments of the present invention will be hereinafter explained with reference to the drawings.

First Embodiment

Figure 1:
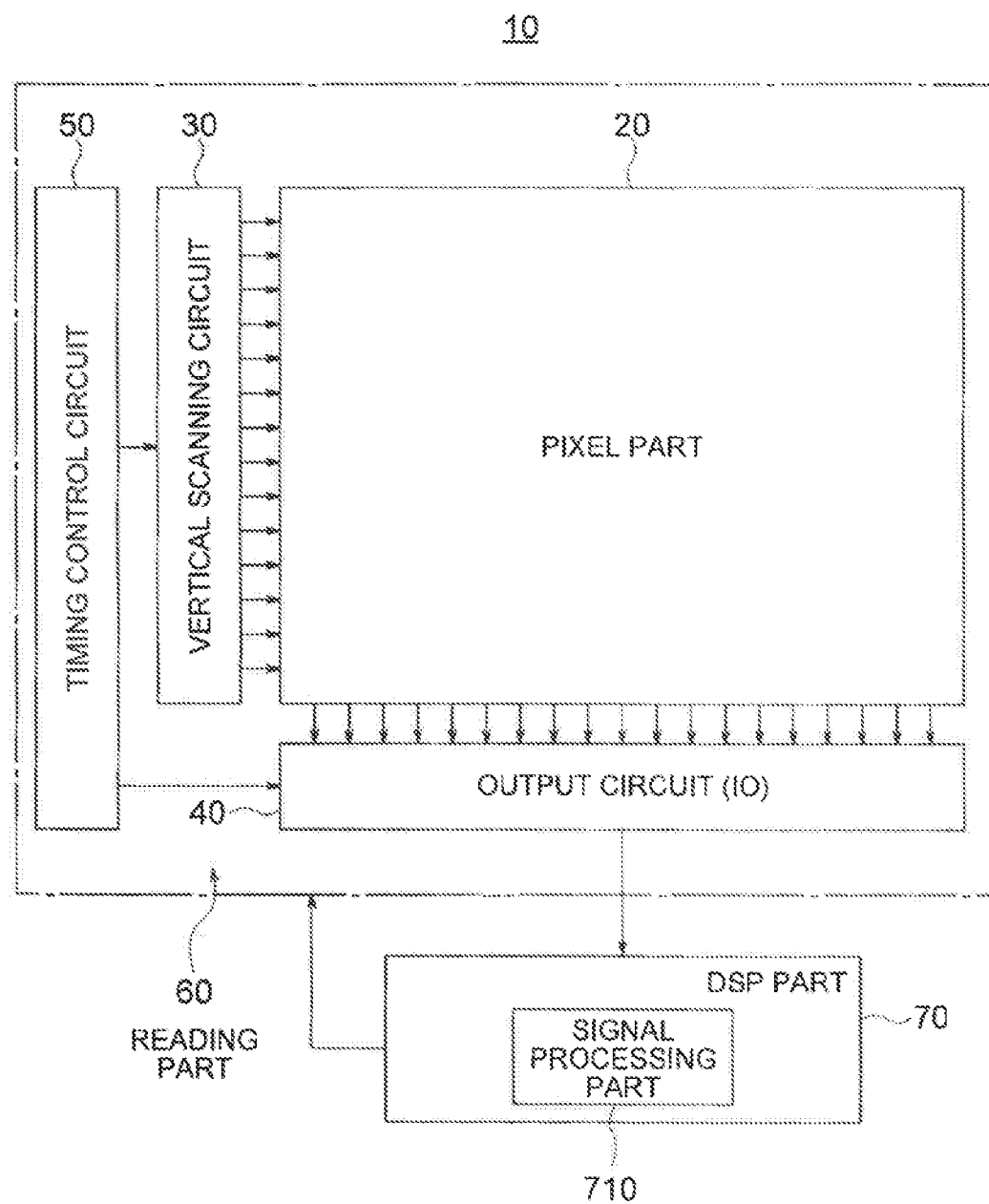
FIG. 1 is a block diagram showing an example of the configuration of a solid-state imaging device according to a first embodiment of the present invention.

FIG. 1 is a block diagram showing an example of the configuration of a solid-state imaging device according to a first embodiment of the present invention. In the present embodiment, a solid-state imaging device 10 is constituted by for example a CMOS image sensor including digital pixels as the pixels.

As shown in FIG. 1, the solid-state imaging device 10 is constituted mainly by an image capturing part constituted by a pixel part 20, a vertical scanning circuit (row scanning circuit) 30, an output circuit 40, a timing control circuit 50, a reading part 60, and a digital signal processor (DSP) including a signal processing part 710. Among these components, for example, the vertical scanning circuit 30, the output circuit 40, and the timing control circuit 50 constitute the reading part 60 for reading out pixel signals.

In the first embodiment, the solid-state imaging device 10 is configured as for example a stacked type CMOS image sensor which, in the pixel part 20, includes digital pixels comprised of photoelectric converting and reading parts, AD (analog-to-digital) conversion parts, and memory parts and has a global shutter operation function. In the solid-state imaging device 10 according to the first embodiment, as will be explained in detail later, each digital pixel DP has an AD conversion function, while the AD conversion part has a comparator performing comparison processing for comparing a voltage signal read out by the photoelectric converting and reading part and a reference voltage and outputting a digitized comparison result signal. The comparator, under the control of the reading part 60, performs a first comparison processing for outputting a digitized first comparison result signal with respect to a voltage signal corresponding to an overflow charge overflowing from the photoelectric conversion element to the output node (floating diffusion) in an integration period and a second comparison processing for outputting a digitized second comparison result signal with respect to a voltage signal corresponding to the accumulated charge of the photoelectric conversion element transferred to the output node in a transfer period after the integration period.

Further, in the first embodiment, the signal processing part 710 of the DSP part 70 performs combinational processing of a first AD conversion transfer curve corresponding to the first comparison processing and a second AD conversion transfer curve corresponding to the second comparison processing for greatly expanding the dynamic range. However, due to the fact that the first comparison processing and the second comparison processing are not successive in operation and an offset occurs at joining points of the two AD conversion transfer curves and the like, it is difficult to smoothly connect the two AD conversion transfer curves by a simple combinational processing. Therefore, in the first embodiment, the signal processing part 710 of the DSP part 70 makes inclinations of the first AD conversion transfer curve signal corresponding to the first comparison processing and the second AD conversion transfer curve signal corresponding to the second comparison processing equal and, in a region before the AD conversion transfer curve signal corresponding to the second comparison processing is saturated, that is, where the linearity is held (for example, a non-saturated region), combines these two types of signals to thereby smoothly connect the two AD conversion transfer curves and acquire a combined signal of a signal having an expanded dynamic range.

The signal processing part 710, in the combinational processing, applies full well capacity (FWC) information of the pixel which is measured to thereby correct a joining gap of the first AD conversion transfer curve and the second AD conversion transfer curve. The applied FNC information is at least the FWC information obtained in the second comparison processing. The specific combinational processing will be explained in detail later.

Note that, "FWC (full well capacity)" means the upper limit of the capacity of accumulating (accommodating) a charge (for example electrons) converted from light received by the photoelectric conversion element comprised of the photodiode PD.

Below, an outline of the configurations and functions of the parts in the solid-state imaging device 10, particularly the configurations and functions of the pixel part 20 and digital pixel, the read-out processing concerned with them, the stacked structure of the pixel part 20 and the reading part 60, and the combinational processing of the two AD conversion transfer curves by the signal processing part 710 of the DSP part 70 and the like will be explained in detail.

Figure 2:
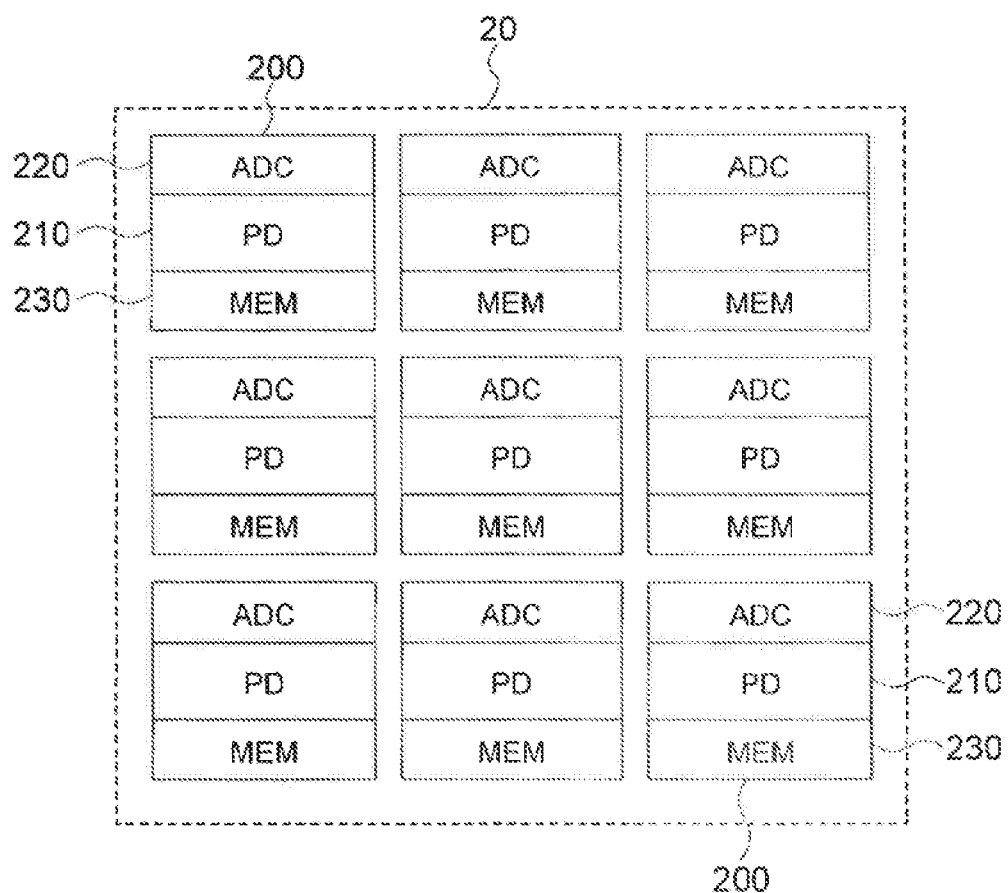
FIG. 2 is a view showing an example of a digital pixel array of a pixel part in the solid-state imaging device according to the first embodiment of the present invention.

Configurations of Pixel Part 20 and Digital Pixel 200 FIG. 2 is a view showing an example of a digital pixel array in a pixel part of the solid-state imaging device 10 according to the first embodiment of the present invention.

Figure 3:
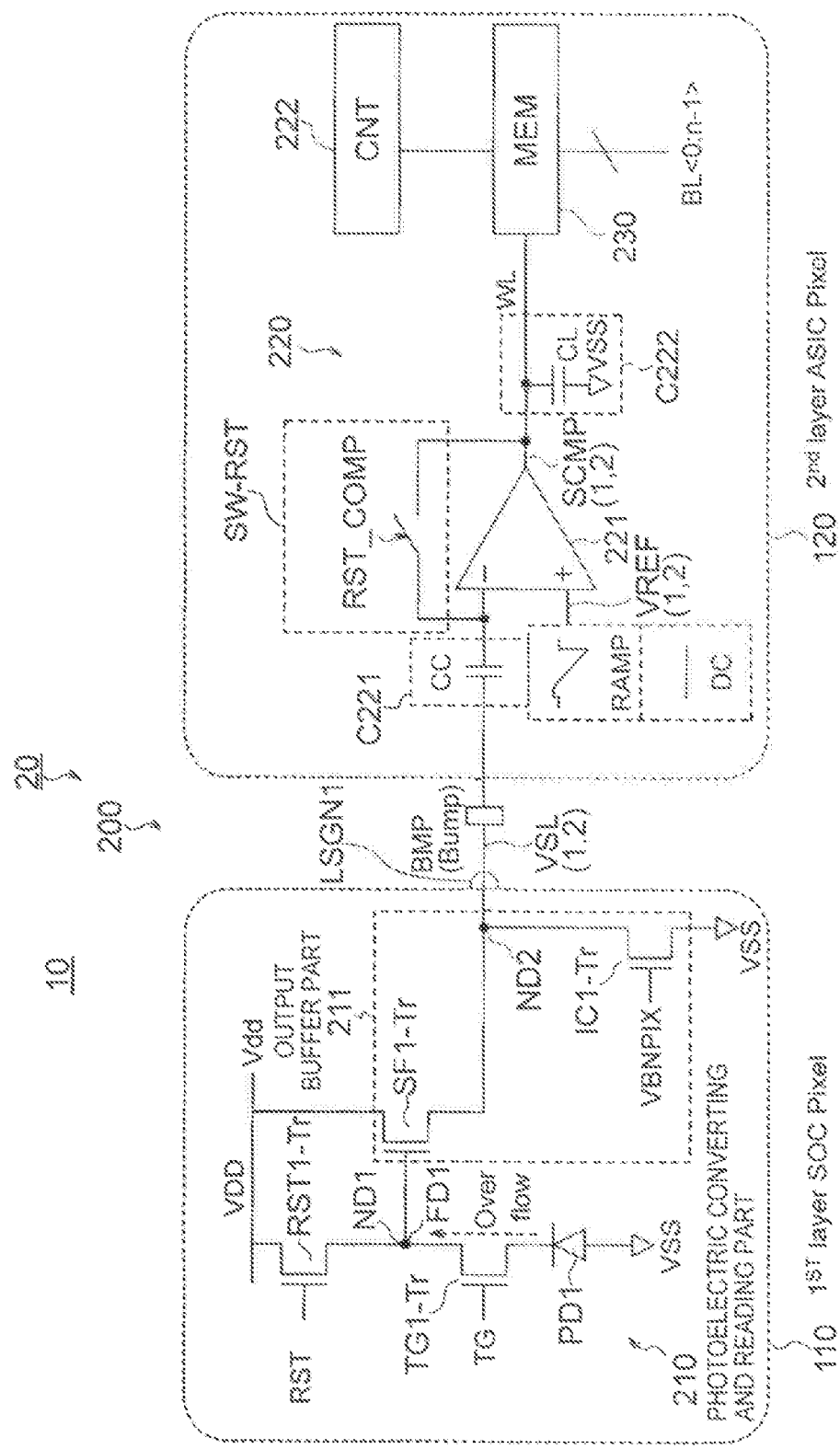
FIG. 3 is a circuit diagram showing an example of a pixel in the solid-state imaging device according to the first embodiment of the present invention.

FIG. 3 is a circuit diagram showing an example of a pixel of the solid-state imaging device 10 according to the first embodiment of the present invention In the pixel part 20, as shown in FIG. 2, a plurality of digital pixels 200 are arranged in a matrix comprised of N rows and M columns. Note that, for simplification of the drawing, FIG. 2 shows an example in which nine digital pixels 200 are arranged in a matrix comprised of 3 rows and 3 columns (matrix where M=3 and N=3).

The digital pixel 200 according to the first embodiment includes a photoelectric converting and reading part (denoted as PD in FIG. 2) 210, AD conversion part (denoted as ADC in FIG. 2) 220, and memory part (denoted as MEM in FIG. 2) 230. The pixel part 20 in the first embodiment, as will be explained in detail later, is configured as a laminated CMOS image sensor constituted by a first substrate 110 and a second substrate 120. In the present example, as shown in FIG. 3, the photoelectric converting and reading part 210 is formed on the first substrate 110, and the AD conversion part 220 and memory part 230 are formed on the second substrate 120.

The photoelectric converting and reading part 210 in the digital pixel 200 includes a photodiode (photoelectric conversion element) and an in-pixel amplifier. Specifically, this photoelectric converting and reading part 210 has for example a photodiode PD1 as a photoelectric conversion element. This photodiode PD1 has one each of a transfer transistor TG1-Tr as a transfer element, a reset transistor RST1-Tr as a reset element, a source follower transistor SF1-Tr as a source follower element, a current transistor IC1-Tr as a current source element, a floating diffusion FD1 as an output node ND1, and a read-out node ND2. In this way, the photoelectric converting and reading part 210 in the digital pixel 200 according to the first embodiment includes the four transistors (4Tr) of the transfer transistor TG1-Tr, the reset transistor RST1-Tr, the source follower transistor SF1-Tr, and the current transistor IC1-Tr.

Further, in the first embodiment, an output buffer part 211 includes the source follower transistor SF1-Tr, the current transistor IC1-Tr, and the read-out node ND2.

In the photoelectric converting and reading part 210 according to the first embodiment, the read-out node ND2 of the output buffer part 211 is connected to the input part of the AD conversion part 220. The photoelectric converting and reading part 210 converts the charge in the floating diffusion FD1 as an output node to a voltage signal corresponding to the quantity of charge and outputs the converted voltage signal VSL to the AD conversion part 220.

More specifically, in the first comparison processing period PCMPR1 of the AD conversion part 220, the photoelectric converting and reading part 210 outputs the voltage signal VSL corresponding to the overflow charge overflowing from the photodiode PD1 as the photoelectric conversion element to the floating diffusion FD1 as an output node in the integration period PI.

Further, in the second comparison processing period PCMPR2 of the AD conversion part 220, the photoelectric converting and reading part 210 outputs the voltage signal VSL corresponding to the accumulated charge of the photodiode PD1 transferred to the floating diffusion FD1 as an output node in the transfer period PT after the integration period PI. In the second comparison processing period PCMPR2, the photoelectric converting and reading part 210 outputs the read-out reset signal (signal voltage) (VRST) and read-out signal (signal voltage) (VSIG) as pixel signals to the AD conversion part 220.

The photodiode PD1 generates a signal charge (here, electrons) in an amount in accordance with the quantity of the incident light and accumulates the same. Below, an explanation will be given of a case where the signal charge is electrons and each transistor is an n-type transistor. However, the signal charge may be positive holes (holes) or each transistor may be a p-type transistor as well. Further, the present embodiment is effective also in a case where each transistor is shared among a plurality of photodiodes and transfer transistors.

In each digital pixel 200, the photodiode (PD) is constituted by a pinned photodiode (PPD). On the substrate surface for forming the photodiode (PD), there is a surface level due to dangling bonds or other defects, therefore a lot of charges (dark current) are generated due to heat energy, so a correct signal fails to be read out. In a pinned photodiode (PPD), the charge accumulation part of the photodiode (PD) is pinned in the substrate, so it becomes possible to reduce mixing the dark current into the signal.

The transfer transistor TG1-Tr in the photoelectric converting and reading part 210 is connected between the photodiode PD1 and the floating diffusion FD1 and is controlled by a control signal TG applied through a control line to the gate. The transfer transistor TG1-Tr is selected and enters a conductive state in the transfer period PT in which the control signal TG is at a high (H) level. It transfers the charge (electrons) which is photo-electrically converted and accumulated in the photodiode PD1 to the floating diffusion FD1. Note that, after the photodiode PD1 and floating diffusion FD1 are reset to the predetermined reset potentials, the transfer transistor TG1-Tr enters a non-conductive state in which the control signal TG is at a low (L) level, and the photodiode PD1 enters into the integration period PI. However, at this time, if the intensity (quantity) of the incident light is very high, the charge exceeding the saturated charge amount overflows to the floating diffusion FD1 as the overflow charge through the overflow path under the transfer transistor TG1-Tr.

The reset transistor RST1-Tr is connected between the power supply line Vdd of the power supply voltage VDD and the floating diffusion FD1 and is controlled by the control signal RST supplied through the control line to the gate. The reset transistor RST1-Tr is selected and enters a conductive state in the reset period in which the control signal RST is at the H level and resets the floating diffusion FD1 to the potential of the power supply line Vdd of the power supply voltage VDD.

The source follower transistor SF1-Tr as a source follower element is connected at the source to the read-out node ND2, is connected at the drain side to the power supply line Vdd, and is connected at the gate to the floating diffusion FD1. The drain and source of the current transistor IC1-Tr as a current source element are connected between the read-out node ND2 and the reference potential VSS (for example GND). The gate of the current transistor IC1-Tr is connected to a supply line of a control signal VBNPIX. Further, a signal line LSGN1 between the read-out node ND2 and the input part of the AD conversion part 220 is driven by the current source element comprised of the current transistor IC1-Tr.

Figure 4:
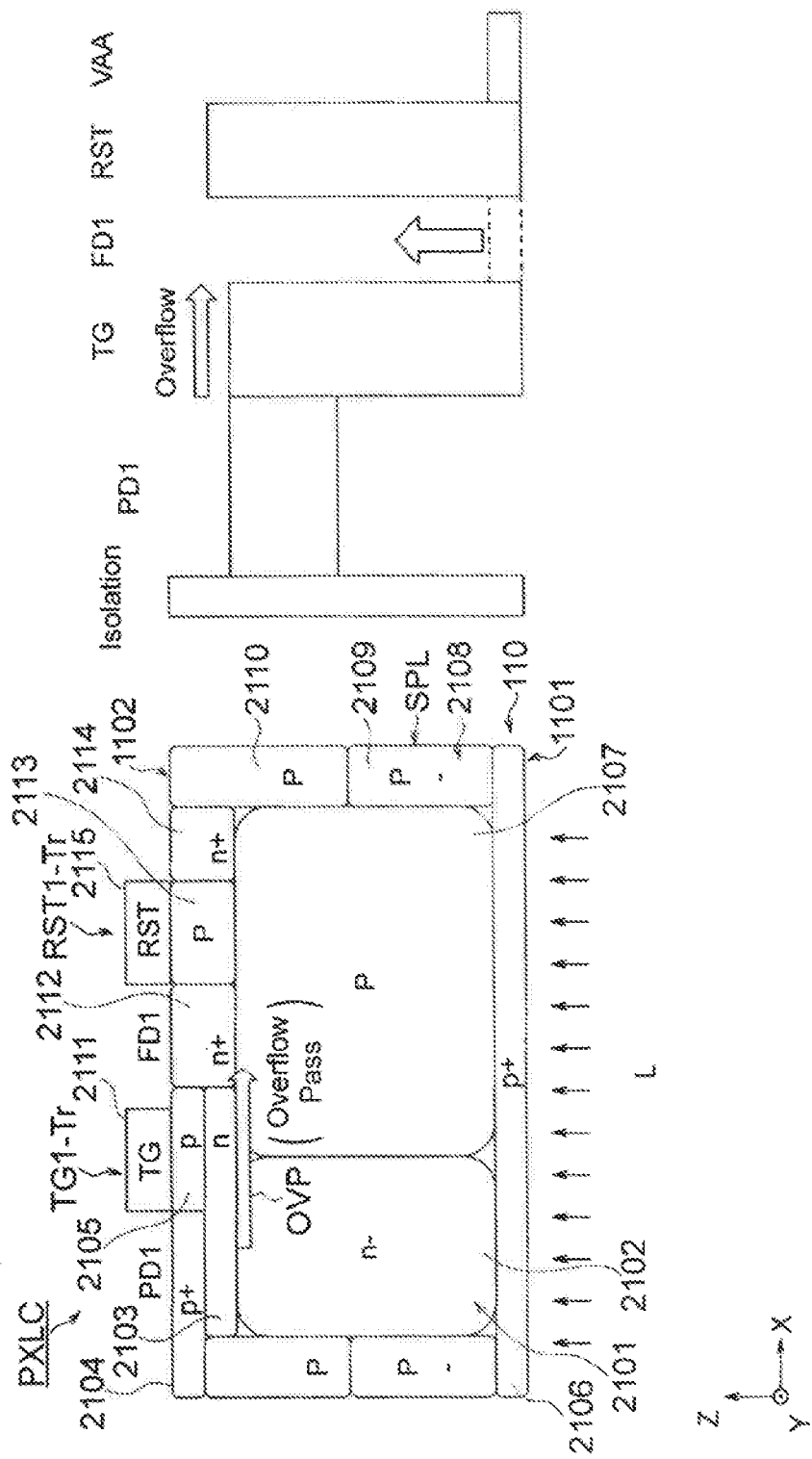
FIG. 4A and FIG. 4B are a simple cross-sectional view showing an example of the configuration of a principal part of the digital pixel according to the first embodiment of the present invention, that is, a charge integration and transfer system, and a potential diagram at the time of overflowing.

FIG. 4A and FIG. 4B are a schematic cross-sectional view showing an example of the configuration of the principal part of a digital pixel according to the first embodiment of the present invention, that is, the charge integration and transfer system, and a potential diagram at the time of overflowing.

Each digital pixel cell PXLC is formed on a semiconductor substrate (first substrate 110 in the present example) having a first substrate surface 1101 side to which the light L is irradiated (for example back surface side) and a second substrate surface 1102 side on the side opposite to this first substrate surface 1101 side and is separated by separation layers SPL. Further, the digital pixel cell PLXC in FIG. 4A includes parts forming the photoelectric converting and reading part 210 such as the photodiode PD1, the transfer transistor TG1-Tr, the floating diffusion FD1, reset transistor RST1-Tr, the separation layers SPL, and further a color filter part and a micro-lens (not shown).

Configuration of Photodiode

The photodiode PD1 includes a semiconductor layer (n-layer in the present embodiment) 2101 of a first conductivity type (n-type in the present embodiment) formed so as to be pinned in the semiconductor substrate having the first substrate surface 1101 side and the second substrate surface 1102 side on the side opposite to the first substrate surface 1101 side and is formed so as to have a photoelectric conversion function of the received light and charge accumulation function. In the side portions of the photodiode PD1 in a direction (X-direction in an orthogonal coordinate system in the drawing) perpendicular to the normal line of the substrate, second conductivity type (p-type in the present embodiment) separation layers SPL are formed.

In this way, in the present embodiment, in each digital pixel cell PXLC, as the photodiode (PD), use is made of a pinned photodiode (PPD). On the substrate surface for forming the photodiode (PD), there is a surface level due to dangling bonds or another defects, therefore a lot of charges (dark current) are generated due to heat energy, so a correct signal ends up being unable to be read out. In a pinned photodiode (PPD), the charge accumulation part of the photodiode (PD) is pinned in the substrate, so it becomes possible to reduce mixing the dark current into the signal.

In the photodiode PD1 in FIG. 4A, the n-layer (first conductivity type semiconductor layer) 2101 is configured so as to have a two-layer structure in the normal line direction of the substrate 110 (Z-direction in the orthogonal coordinate system in the drawing). In the present example, an n-layer 2102 is formed on the first substrate surface 1101 side, an n-layer 2103 is formed on the second substrate surface 1102 side of this n$^-$-layer 2102, and p$^+$-layer 2104 and p-layer 2105 are formed on the second substrate surface 1102 side of this n-layer 2103. Further, a p$^+$-layer 2106 is formed on the first substrate surface 1101 side of the n$^-$-layer 2102. The p$^+$-layer 2106 is formed uniformly covering not only the photodiode PD1, but also the separation layers SPL and further other digital pixel cells PXLC.

Note that, on the light incident side of this p$^+$-layer 2106, a color filter part is formed. Further, a micro-lens is formed on the light incident side of the color filter part so as to correspond to a portion of the photodiode PD1 and separation layers SPL.

These configurations are one example. The structure may be a single layer structure or may be a three-layer, four-layer, or higher stacked structure.

Configuration of Separation Layers in X-Direction (Column Direction)

In a p-type separation layer SPL in the X-direction (column direction) in FIG. 4A, a first p-layer (second conductivity type semiconductor layer) 2107 is formed on the side contacting the n⁻-layer 2102 of the photodiode PD1 and at the right side part in the direction (X-direction in the orthogonal coordinate system in the drawing) perpendicular to the normal line of the substrate. Further, in a p-type separation layer SPL, on the right side in the X-direction of the first p-layer 2107, a second p-layer (second conductivity type semiconductor layer) 2108 is formed so as to give a two-layer structure in the normal line direction of the substrate 110 (Z-direction in the orthogonal coordinate system in the drawing). In the present example, in the second p-layer 2108, a p⁻-layer 2109 is formed on the first substrate surface 1101 side, while a p-layer 2110 is formed on the second substrate surface 1102 side of this p⁻-layer 2109.

These configurations are one example. The structure may be a single layer structure or may be a three-layer, four-layer, or higher stacked structure.

On the first substrate surface 1101 side of the first p-layer 2107 and second p⁻-layer 2109 in the p-type separation layer SPL, a p⁺-layer 2106 the same as the photodiode PD1 is formed.

An n-layer 2103 is formed so as to extend so that an overflow path OVP is formed covering a portion on the second substrate surface 1102 side of the first p-layer 2107 in the p-type separation layer SPL. Further, on the p-layer 2105 on the second substrate surface 1102 side of the n-layer 2103, a gate electrode 2111 of the transfer transistor TG1-Tr is formed through a gate insulation film. Further, on the second substrate surface 1102 side of the first p-layer 2107 in the p-type separation layer SPL, an n⁺-layer 2112 for forming the floating diffusion FD1 is formed. A p-layer 2113 for forming the channel-forming region of the reset transistor RST1-Tr is formed adjacent to the n⁺-layer 2112 while an n⁺-layer 2114 is formed adjacent to the p-layer 2113. Further, on the p-layer 2113, a gate electrode 2115 is formed through a gate insulation film.

In such a structure, if the intensity (quantity) of the incident light is very high, a charge exceeding the saturated charge amount overflows as the overflow charge to the floating diffusion FD1 through the overflow path OVP under the transfer transistor TG1-Tr.

The AD conversion part 220 in the digital pixel 200 has a function of comparing the analog voltage signal VSL output by the photoelectric converting and reading part 210 with a reference voltage VREF of a ramp waveform changed with a predetermined inclination or of a fixed voltage and converting the result to a digital signal.

The AD conversion part 220, as shown in FIG. 3, is configured including a comparator (COMP) 221, a counter (CNT) 222, an input side coupling capacitor C221, an output side load capacitor C222, and a reset switch SW-RST.

In the comparator 221, the inverted input terminal (−) as the first input terminal is supplied with the voltage signal VSL which was output from the output buffer part 211 of the photoelectric converting and reading part 210 to the signal line LSGN1, while the non-inverted input terminal (+) as the second input terminal is supplied with the reference voltage VREF. The comparator performs comparison processing comparing the voltage signal VST and the reference voltage VREF and outputting the digitized comparison result signal SCMP.

In the comparator 221, the coupling capacitor C221 is connected to the inverted input terminal (−) as the first input terminal. By AC-coupling of the output buffer part 211 of the photoelectric converting and reading part 210 on the first substrate 110 side and the input part of the comparator 221 in the AD conversion part 220 on the second substrate 120 side, it is possible to lower noise and to realize a high SNR at the time of low light.

Further, in the comparator 221, the reset switch SW-RST is connected between the output terminal and the inverted input terminal (−) as the first input terminal, while the load capacitor C222 is connected between the output terminal and the reference potential VSS.

Basically, in the AD conversion part 220, the analog signal (potential VSL) read out from the output buffer part 211 of the photoelectric converting and reading part 210 to the signal line LSGN1 is compared in the comparator 221 with the reference voltage VREF, for example, a ramp signal RAMP with a slope waveform linearly or non-linearly changing with a certain inclination. At this time, a counter 222 which is arranged for each column in the same way as the comparator 221 is operating. Therefore, by the ramp signal RAMP with the ramp waveform and the counter value changing in one-to-one correspondence, the voltage signal VSL is converted to a digital signal. Basically, in the AD conversion part 220, the change of the reference voltage VREF (for example ramp signal RAMP) is conversion of a change of voltage to a change of time. By counting that time in certain cycle (clock), it is converted to a digital value. Further, when the analog signal VSL and the ramp signal RAMP (reference voltage VREF) cross, the output of the comparator 221 inverts and the input clock of the counter 222 is stopped or the clock stopped being input is input to the counter 222. The value (data) of the counter 222 at that time is stored in the memory part 230 to thereby complete the AD conversion. After the end of the above AD conversion period, the data (signal) stored in the memory part 230 in each digital pixel 200 is output from the output circuit 40 to a DSP part 70, whereupon a two-dimensional image is generated by predetermined signal processing.

First Comparison Processing and Second Comparison Processing in Comparator 221

Further, the comparator 221 in the AD conversion part 220 in the first embodiment is controlled in drive by the reading part 60 so as to perform the following two processings, i.e., the first comparison processing and the second comparison processing, in the reading period of pixel signals.

In the first comparison processing CMPR1, under the control of the reading part 60, the comparator 221 outputs a digitized first comparison result signal SCMP1 with respect to a voltage signal VSL1 corresponding to the overflow charge overflowing from the photodiode PD1 as the photoelectric conversion element to the floating diffusion FD1 as the output node in the integration period PI. Note that, the operation of this first comparison processing CMPR1 is also referred to as a "time stamp ADC (TS-ADC) mode operation".

In the second comparison processing CMPR2, under the control of the reading part 60, the comparator 221 outputs a digitized second comparison result signal SCMP2 with respect to a voltage signal VSL2 (VSIG) corresponding to the accumulated charge of the photodiode PD1 transferred to the floating diffusion FD1 as the output node in the transfer period PT after the integration period PI. In actuality, in the second comparison processing CMPR2, before the voltage signal VSL2 (VSIG) corresponding to the accumulated charge is digitized, the voltage signal VSL2 (VRST) corresponding to the reset voltage of the floating diffusion FD1 at the time of resetting is digitized. Note that, the operation of this second comparison processing CMPR2 is a sampling operation of the accumulated charge and is also referred to as a "linear ADC mode operation".

Note that, in the present embodiment, basically the integration period PI is the period from when the photodiode PD1 and floating diffusion FD1 are reset to the reset level to when the transfer transistor TG1-Tr is switched to a conductive state and the transfer period PT is started. The period PCMPR1 of the first comparison processing CMPR1 is the period after the start of resetting of the photodiode PD1 and floating diffusion FD1 to the reset level up to when the floating diffusion FD1 is reset to the reset level before the start of the transfer period PT. The period PCMPR2 of the second comparison processing CMPR2 is the period after the reset of the floating diffusion FD1 to the reset level and is the period including the transfer period PT and following period.

Figure 5:
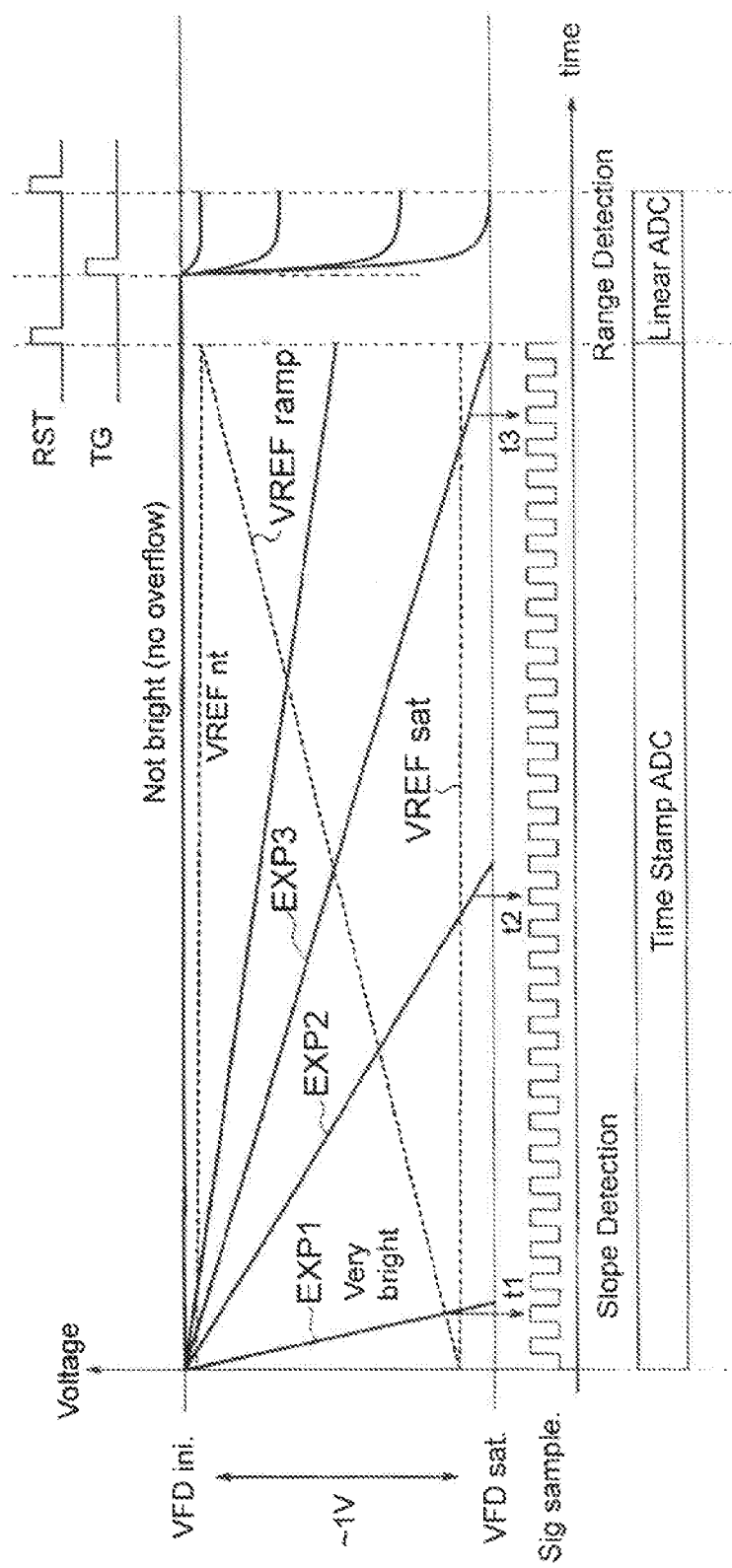
FIG. 5 is a view for explaining a first comparison processing of a comparator according to the embodiment.

Here, the first comparison processing CMPR1 will be further explained in detail. FIG. 5 is a view for explaining the first comparison processing CMPR1 of the comparator 221 according to the present embodiment. In FIG. 5, an abscissa indicates the time, and an ordinate indicates the voltage level VFD of the floating diffusion FD1 as the output node.

Looking at the voltage level VFD of the floating diffusion FD1, at the time of the reset level, the quantity of charge is the smallest and the voltage level VFD becomes the highest level VFDini. On the other hand, at the time of the saturation state, the quantity of charge is the largest and the voltage level VFD becomes a low level VFDsat. According to such conditions, the reference voltage VREF1 of the comparator 221 is set to a voltage VREFsat which is fixed to the level at the time of the non-saturation state before the saturation state or is set to a ramp voltage VREFramp changing from a voltage level VREFrst at the time of reset level up to the voltage level VREFsat.

If such a reference voltage VREF1 is set at VREFsat or VREFramp at the time of the first comparison processing CMPR1, as shown in FIG. 5, at the time of high light when the intensity of the incident light is high, the quantity of charge is larger, therefore the time of flipping (inversion) of the output of the comparator 221 is fast. In a case of example EXP1 of the highest light, the output of the comparator 221 immediately flips (inverts) at the time t1. In a case of example EXP2 of light lower than that in example EXP1, the output of the comparator 221 flips (inverts) at the time t2 later than the time t1. In a case of example EXP3 of a light lower than that in example EXP2, the output of the comparator 221 flips (inverts) at the time t3 later than the time t2.

In this way, in the first comparison processing CMPR1, the comparator 221 outputs the first comparison result signal SCMP1 with respect to the time corresponding to the quantity of overflow charge from the photodiode PD1 to the floating diffusion FD1 for a predetermined time period in the integration period PI.

More specifically, in the first comparison processing CMPR1, the comparator 221 can handle comparison processing with a light level from a signal level corresponding to a predetermined threshold value of the photodiode PD1 at the maximum sampling time at which the overflow charge begins to overflow from the photodiode PD1 to the floating diffusion FD1 as the output node to the signal level obtained at the minimum sampling time.

As explained above, the photo conversion operation in the time stamp ADC (TS-ADC) mode is executed in the integration period PI accompanied by light-to-time conversion. As shown in FIG. 5, under a very bright light, the output state of the comparator 221 is inverted immediately after the reset activation period, and the light level thereof corresponds to the saturation signal (well capacity) explained by the following time:

$$((\text{FD saturation amount} \times \text{integration time})/\text{sampling period}) + \text{PD saturation amount}$$

For example, assume that FD saturation: 8Ke@150 uV/e to 1.1 fF of FD capacity, minimum sampling time: 15 nsec, and integration time: 3 msec.

In this time stamp ADC operation mode, as explained above, it is possible to cover the light level from a signal level corresponding to the predetermined threshold value of the photodiode PD1 at the maximum sampling time at which the overflow charge begins to overflow from the photodiode PD1 to the floating diffusion FD1 as the output node to a signal level obtained at the minimum sampling time.

Figure 6:
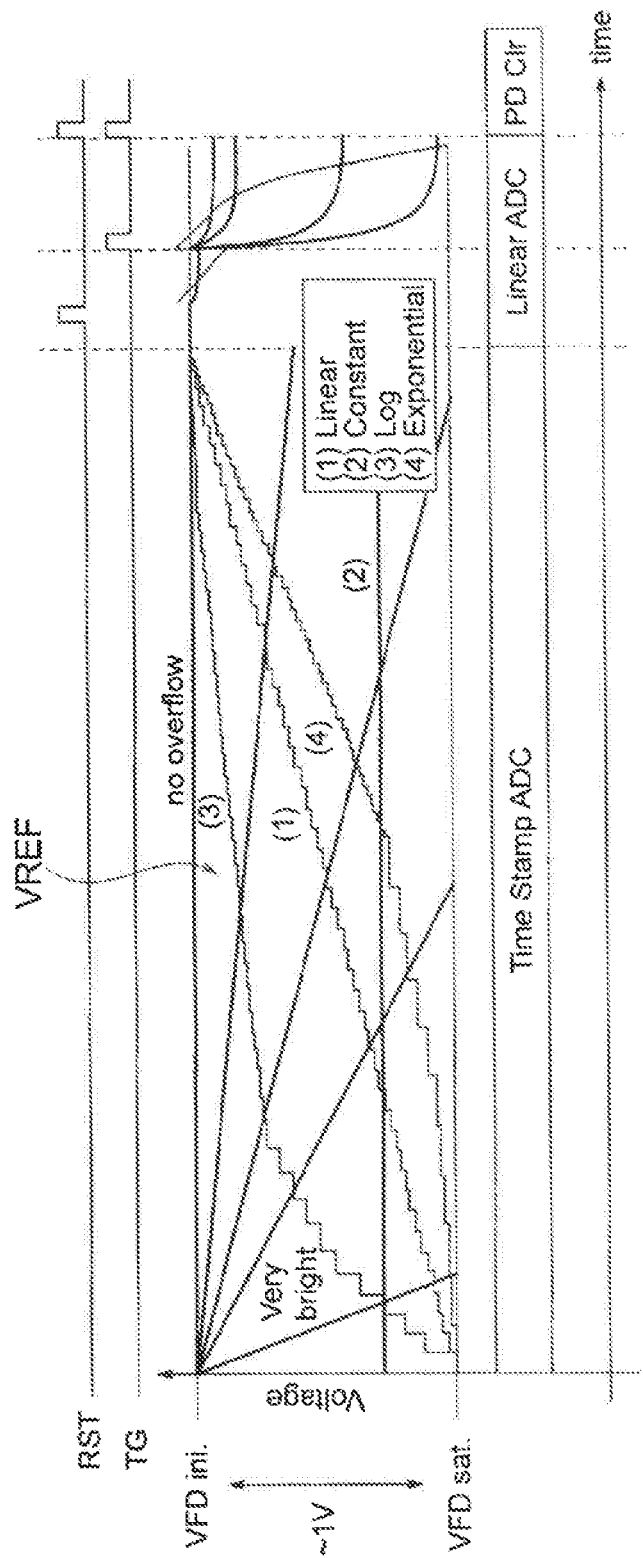
FIG. 6 is a view for explaining the first comparison processing of the comparator according to the embodiment and for explaining an example of another pattern of a reference voltage.

FIG. 6 is a view for explaining the first comparison processing CMPR1 of the comparator 221 according to the present embodiment and explaining an example of another pattern of the reference voltage.

The reference voltage VREF may be a ramp waveform (signal) RAMP changing with a predetermined inclination as indicated by (1) in FIG. 6 or a fixed voltage DC indicated by (2) in FIG. 6 as well. Further, it may be a log indicated by (3) in FIG. 6 or a voltage signal taking an exponential value indicated by (4) in FIG. 6 as well.

Figure 7:
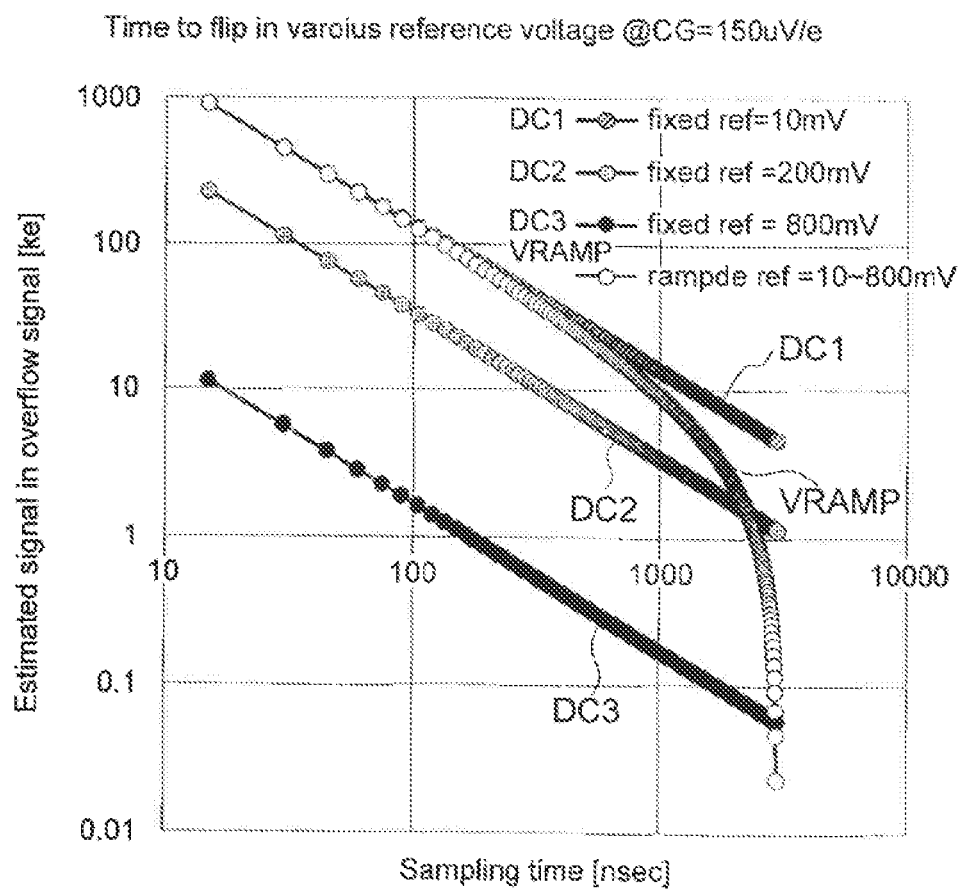
FIG. 7 is a view showing states of light-to-time conversion where various reference voltages are input to the comparator according to the embodiment.

FIG. 7 is a view showing states of light-to-time conversion where various reference voltages VREF are input to the comparator according to the present embodiment. In FIG. 7, an abscissa indicates the sampling time, and an ordinate indicates the estimated signal in the overflow signal.

FIG. 7 shows a sampling time at which the comparator 221 inverts which corresponds to the overflow charge (signal) according to the nature (suitability) of the light applied. FIG. 7 shows the sampling time which inverts for a variety of fixed reference voltages DC1, DC2, and D3 and the ramp reference voltage VRAMP. Here, use is made of a linear reference ramp.

When the operation of the time stamp ADC (TS-ADC) mode for performing the first comparison processing CMPR1 with respect to the saturated overflow charge as described above ends, after resetting the floating diffusion FD1 and comparator 221, the processing shifts to the operation of the linear ADC (LIN-ADC) mode for performing the second comparison processing CMPR2 with respect to the non-saturated charge.

Figure 8:
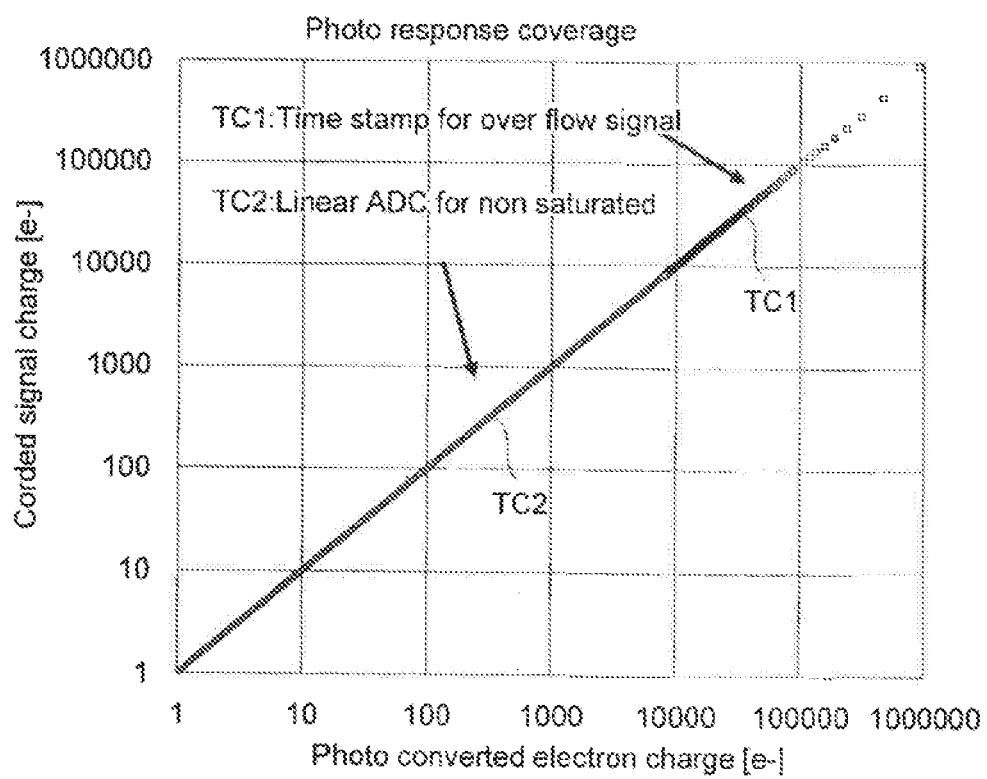
FIG. 8 is a view showing a light response coverage in the digital pixel according to the first embodiment of the present invention.

FIG. 8 is a view showing a photo response coverage in the digital pixel according to the first embodiment of the present invention. In FIG. 8, TC1 indicates the signal (AD conversion transfer curve) according to the time stamp ADC mode operation, and TC2 indicates the signal (AD conversion transfer curve) according to the linear ADC mode operation.

The time stamp ADC mode has a photo response with respect to very bright light, therefore the linear ADC mode can have a photo response from a dark level. For example, a dynamic range performance of 120 dB can be realized. For example, as explained above, the saturation signal of the photo conversion range is 900 Re. The linear ADC mode is a usual reading mode operation to which ADC is applied, therefore can cover from a noise level of 2e up to the saturation of the photodiode PD1 and floating diffusion FD1 of 8 Ke. The coverage of the linear ADC mode can be expanded to 30 Ke by an additional switch and capacity.

FIG. 8 shows a case where the combinational processing of the first AD conversion transfer curve TC1 corresponding to the first comparison processing CMPR1 and the second AD conversion transfer curve TC2 corresponding to the second comparison processing CMPR2 is ideally carried out, so there is no joining gap at the joining part (joining region) of the two curves TC1 and TC2 and smooth switching (connection) is carried out.

In actuality, however, there are variations in units of individual specimens of solid-state imaging devices, variations among the pixels within individual specimens, etc. Therefore, even if switching signals by numerical values corrected based on the parameter of the center value of the variation, sometimes the linearity in the vicinity of that level is not always guaranteed. When the precision of correction is low (varies) in this way, smooth switching becomes impossible, discontinuous points become noise, and this becomes a cause of so-called tone jump or other image deterioration. Therefore, in the present embodiment, as will be explained in detail later, the signal processing part 710 of the DSP part 70 performs combinational processing applying the FWC information of the pixel which is measured and correcting the joining gap between the first AD conversion transfer curve TC1 corresponding to the first comparison processing CMPR1 and the second AD conversion transfer curve TC2 corresponding to the second comparison processing CMPR2 to thereby enable smooth switching (connection) of a plurality of signals to be combined and suppress deterioration of the image while substantially realizing a broader dynamic range.

Figure 9:
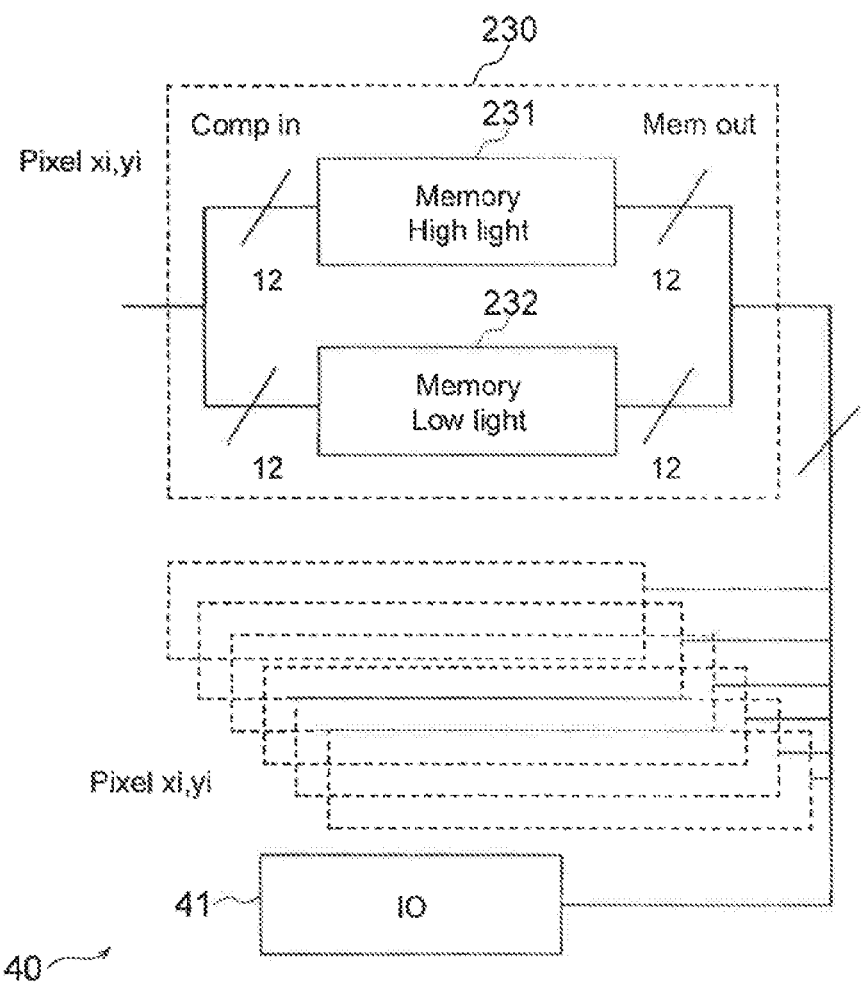
FIG. 9 is a view showing an example of configurations of a memory part and output circuit according to the first embodiment of the present invention.

FIG. 9 is a view showing an example of the configuration of a memory part and output circuit according to the first embodiment of the present invention.

In the comparator 221, the first comparison result signal SCMP1 obtained by digitalization of the voltage signal corresponding to the overflow charge of the floating diffusion FD1 by the first comparison processing CMPR1 and the second comparison result signal SCMP2 obtained by digitalization of the accumulated charge in the photodiode PD1 by the second comparison processing CMPR2 are stored as digital data in the memories 231 and 232 linked with each other. The memory part 230 is configured by an SRAM or DRAM, and the digital-converted signal is supplied to this. The signal corresponds to the photo conversion code and can be read out by an external IO buffer 41 of the output circuit 40 on the periphery of the pixel array.

FIG. 10 is a view showing an example of the frame read out sequence in the solid-state imaging device 10 according to the first embodiment of the present invention. Here, an example of the frame read-out method in the solid-state imaging device 10 will be explained. In FIG. 10, TS indicates the processing time of the time stamp ADC, and Lin indicates the processing period of the linear ADC.

As explained above, the overflow charge is accumulated in the floating diffusion FD1 in the integration period PI. The time stamp ADC mode operates in the integration period PI. In actuality, the time stamp ADC mode operates for a period in the integration period PI up to the reset of the floating diffusion FD1. When the operation of the time stamp ADC mode ends, the operation shifts to the linear ADC mode where conversion is carried out so as to read the signal (VRST) at the time of reset of the floating diffusion FD1 and store the digital signal in the memory part 230. Further, after the end of the integration period PI, in the linear ADC mode, conversion is carried out so as to read the signal (VSIG) in accordance with the accumulated charge of the photodiode PD1 and store the digital signal in the memory part 230. The read-out frame is executed by reading the digital signal data from the memory node. It has an MIPI data format and is, for example, sent to the DSP part 70 of the outside of the solid-state imaging device 10 (image sensor) through an IO buffer 41 of the output circuit 40 (FIG. 9). This operation can be globally executed with respect to the entire pixel array.

Further, in the pixel part 20, the reset transistors RST1-Tr and the transfer transistors TG1-Tr are used to reset the photodiodes PD1 simultaneously for all of the pixels to thereby start the exposure for all of the pixels simultaneously and in parallel. Further, after the predetermined exposure period (integration period PI) ends, the transfer transistors TG1-Tr are used to sample the output signals from the photoelectric converting and reading parts 210 at the AD conversion parts 220 and memory parts 230 to thereby end the exposure simultaneously and in parallel for all pixels. Due to this, a global shutter operation is realized electronically.

The vertical scanning circuit 30 drives the photoelectric converting and reading parts 210 in the digital pixels 200 through the row scanning control line in the shutter rows and read rows under the control of the timing control circuit 50. Under the control of the timing control circuit 50, the vertical scanning circuit 30 supplies reference voltages VREF1 and VREF2 set according to the first comparison processing CMPR1 and second comparison processing CMPR2 to the comparators 221 in the digital pixels 200. Further, the vertical scanning circuit 30, according to the address signals, outputs the row selection signals of row addresses of the read row for reading of the signal and the shutter row for resetting the charges accumulated in the photodiodes PD1.

The output circuit 40, for example, as shown in FIG. 9, includes the IO buffer 41 arranged corresponding to the memory output of each digital pixel 200 in the pixel part 20 and outputs the digital data read out from each digital pixel 200 to the outside.

The timing control circuit 50 generates timing signals necessary for signal processing of the pixel part 20, the vertical scanning circuit 30, the output circuit 40, and the like.

In the first embodiment, for example, at the time of the global shutter mode, the reading part 60 performs the read-out control of the pixel signals from the digital pixels 200.

In the DSP part 70, the input digital signals are subjected to correlated double sampling (CDS), black correction, digital gain, and other image signal processing, then the results are output adapted to the output format at for example the SLVS interface part.

Combinational Processing of First AD Conversion Transfer Curve TC1 and Second AD Conversion Transfer Curve TC2

In the first embodiment, the signal processing part 710 of the DSP part 70 applies the FWC information of the pixel which is measured to perform combinational processing correcting the joining gap between the first AD conversion transfer curve TC1 corresponding to the first comparison processing CMPR1 and the second AD conversion transfer curve TC2 corresponding to the second comparison processing CMPR2 and combine the two signals to generate a high dynamic range signal expanded in dynamic range.

That is, in the first embodiment, the signal processing part 710 of the DSP part 70 carries out the combinational processing joining the first AD conversion transfer curve TC1 corresponding to the first comparison processing CMPR1 and the second AD conversion transfer curve TC2 corresponding to the second comparison processing CMPR2 in order to greatly expand the dynamic range. However, the first comparison processing and the second comparison processing are not successive in operation so an offset is generated at the connection point of the two AD conversion transfer curves. Due to this etc., it is difficult to smoothly connect the two AD conversion transfer curves by simple combinational processing. Therefore, in the first embodiment, the signal processing part 710 of the DSP part 70 makes the inclinations of the first AD conversion transfer curve TC1 corresponding to the first comparison processing CMPR1 and the second AD conversion transfer curve TC2 corresponding to the second comparison processing CMPR2 schematically equal and combines these two types of signals right before the saturation of the AD conversion transfer curve TC2 corresponding to the second comparison processing CMPR2, that is, in the region where the linearity is maintained (non-saturated region) to thereby smoothly connect the two AD conversion transfer curves and acquire a combined signal of a signal expanded in dynamic range.

In the combinational processing, the signal processing part 710 applies the FWC (full well capacity) information of the pixel which is measured to correct the joining gap between the first AD conversion transfer curve TC1 and the second AD conversion transfer curve TC2. The applied FWC information is at least the FWC information obtained in the second comparison processing.

Measurement Methods of FWC Information

The methods for measuring the FWC information include a first measurement method for measurement on-line and a second measurement method for measurement off-line. "On-line" includes the time when the solid-state imaging device is normally operating, while "off-line" includes the time when the solid-state imaging device is not normally operating, for example, the time before shipping.

First Measurement Method for On-Line Measurement

FIG. 11A to FIG. 11C are views for explaining the first measurement method for measuring the FWC information of the solid-state imaging device according to the present embodiment on-line.

The inversion of the output of the comparator 221 during the first comparison processing CMPR1 of the time stamp ADC (TS-ADC) mode operation means that the accumulated charge of the photodiode PD1 as the photoelectric conversion element is already full, so the state is one where an overflow charge overflows from the photodiode PD1 to the floating diffusion FD1 as the output node. Therefore, in order to obtain the FWC information, for each row, after the end of the time stamp ADC (TS-ADC) mode operation, a simple and short second comparison processing CMPR2 of a pseudo linear ADC (LIN-ADC) mode operation is carried out by an analog CDS without modulation. For example, only the portion of ¼ or ⅛ of the upper part in the reference voltage VREF2 of the ramp voltage is conducted. Here, only the FWC information of the photodiode PD1 need be acquired, so this method is sufficient.

In this way, in the first measurement method, at the on-line mode where the solid-state imaging device 10 is normally operating, the FWC information is measured (acquired) from the result obtained by performing the first comparison processing CMPR1 of the time stamp ADC (TS-ADC) mode operation, then performing the simple second comparison processing of the linear ADC (LIN-ADC) mode operation using the ramp shaped reference voltage without modulation.

Second Measurement Method for Off-Line Measurement

FIG. 12A to FIG. 12C are views for explaining a second measurement method for measuring the FWC information of the solid-state imaging device according to the present embodiment off-line.

For example, before shipping, in all pixels, first, as shown in FIG. 12A, the control signals TG and RST are held at an L level and the transfer transistor TG1-Tr and reset transistor RST1-Tr are held in a non-conductive state (off state). In this state, the power supply voltage VDD is lowered to a level corresponding to an L level and the charge is accumulated (charged) in the photodiode PD1. Next, as shown in FIG. 12B, the power supply voltage VDD is returned to an original drive level, the reset transistor RST1-Tr is turned on or off to clear (reset) the floating diffusion FD1, and an excessive charge in the photodiode PD1 is discharged. Further, as shown in FIG. 12C, the transfer transistor TG1-Tr is rendered a conductive state (on state) and is made to transfer the charge in the photodiode PD1 to the floating diffusion FD1 and to thereby perform the linear ADC (LIN-ADC) mode operation for the read-out signal by modulation in the analog and/or digital CDS.

In this way, in the second measurement method, the FMC information is measured in advance by driving each pixel off line when the solid-state imaging device is not normally operating. Note that, in this second measurement method for measurement off line, by conducting measurement two or more number of times and averaging the results, the read-out noise can be reduced and it is possible to realize high precision FWC measurement.

The signal processing part 710 performs combinational processing applying the measured FWC information and smoothly joining the first AD conversion transfer curve TC1 corresponding to the first comparison processing CMPR1 and the second AD conversion transfer curve TC2 corresponding to the second comparison processing CMPR2. This combinational processing method is basically different between a case where the reference voltage VREF supplied to the comparator 221 is a linear ramp shaped reference voltage VREF-LR and a case where it is a modulated ramp shaped reference voltage VREF-MR.

The linear ramp shaped reference voltage VREF-LR is a linear ramp shaped voltage signal with a step size (mV/LSB) of a single value throughout the input range of the comparator 221 at the time of the first comparison processing CMPR1 of the time stamp ADC mode operation and the time of the second comparison processing CMPR2 of the linear ADC mode operation. The modulated ramp shaped reference voltage VREF-R is a modulated non-linear ramp shaped voltage signal with a step size (mV/LSB) not of a single value, but able to continuously change.

Below, as the combinational processing method in the signal processing part 710, three of the first combinational processing method, the second combinational processing method, and the third combinational processing method will be explained for each of the case where the reference voltage VREF is the linear ramp shaped reference voltage VREF-LR and the case where it is the modulated ramp shaped reference voltage VREF-MR.

First Combinational Processing Method

First, the first combinational processing method in the signal processing part 710 in the case where the reference voltage is the linear ramp shaped reference voltage VREF-LR will be explained.

Figure 13:
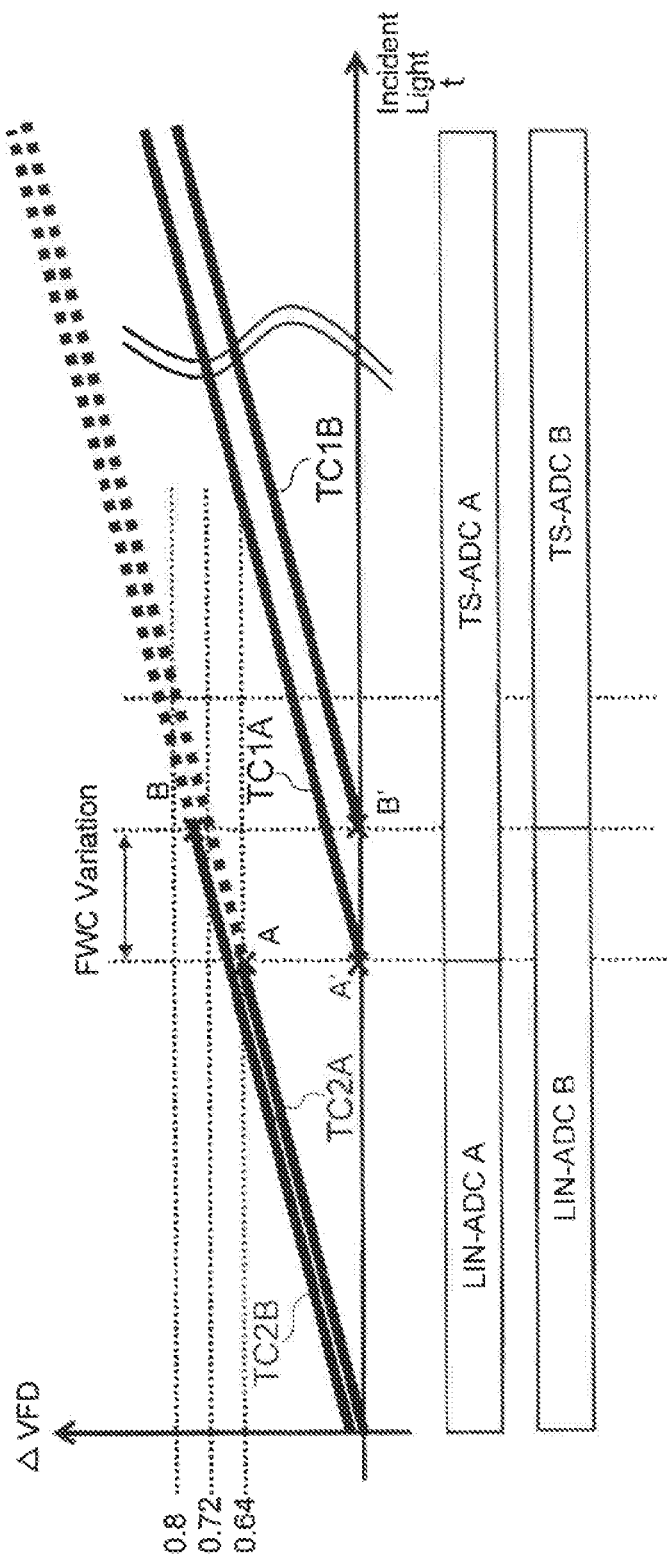
FIG. 13 is a view for explaining a first combinational processing method in a signal processing part where the reference voltage is a linear ramp shaped reference voltage in the solid-state imaging device according to the embodiment.

FIG. 13 is a view for explaining the first combinational processing method in the signal processing part 710 in the case where the reference voltage is the linear ramp shaped reference voltage VREF-LR in the solid-state imaging device 10 according to the present embodiment. In FIG. 13, an abscissa shows the quantity of the incident light, and an ordinate shows the voltage level VFD of the floating diffusion FD1 as the output node.

FIG. 13 shows a case where a first AD conversion transfer curve TC1A and a second AD conversion transfer curve TC2A of a pixel PXLC-A are joined and combined and a case where a first AD conversion transfer curve TC1B and a second AD conversion transfer curve TC2B of a pixel PXLC-B are joined and combined in parallel. In FIG. 13, A indicates the maximum AD conversion code as the FWC information of the second AD conversion transfer curve TC2A in the joining part of the pixel PXLC-A, and A' indicates the minimum AD conversion code as the FWC information of the first AD conversion transfer curve TC1A in the joining part of the pixel PXLC-A. In FIG. 13, B indicates the maximum AD conversion code as the FWC information of the second AD conversion transfer curve TC2B in the joining part of the pixel PXLC-B, and B' indicates the minimum AD conversion code as the FWC information of the first AD conversion transfer curve TC1B in the joining part of the pixel PXLC-B.

In the case where the reference voltage is the linear ramp shaped reference voltage VREF-LR, the signal processing part 710 acquires the AD conversion code at the joining part. Specifically, it acquires the maximum AD conversion codes A and B of the second AD conversion transfer curve TC2 at the time of the LIN-ADC mode and the minimum AD conversion codes A' and B' of the first AD conversion transfer curve TC1 at the time of the TS-ADC mode. Further, it shifts the minimum AD conversion codes A' and B' at the time of the TS-ADC mode to the maximum AD conversion codes A and B at the time of the LIN-ADC mode. In this case, the step size does not change, therefore smooth joining (connection) is realized by only adjusting offset.

As shown in FIG. 13, the FWC of each pixel PXLC changes by about 20%. Accordingly, the constant maximum value cannot be obtained at the time of the TS-ADC mode. Therefore, for all pixels PXLC, the AD conversion codes of the LI-ADC mode are used as the standard. In FIG. 13, fluctuation of the FWC between the AD conversion codes A and B must be identified as the start points of the minimum AD conversion codes A' and B'. Further, as explained above, the minimum AD conversion codes A' and B' at the time of the TS-ADC mode are shifted to the maximum AD conversion codes A and B at the time of the LIN-ADC mode. Due to this, the two of the second AD conversion transfer curve TC2A and the first AD conversion transfer curve TC1A and the second AD conversion transfer curve TC2B and the first AD conversion transfer curve TC1B are smoothly joined.

Second Combinational Processing Method

Next, the second combinational processing method in the signal processing part 710 in the case where the reference voltage is the modulated non-linear ramp shaped reference voltage VREF-MR will be explained.

As the method for generating the modulated non-linear ramp shaped reference voltage VREF-MR, the following two methods can be mentioned. In the first method, the ramp waveform is linear and is generated by modulating the AD conversion code step. In the second method, the ramp waveform is changed and is generated by making the AD conversion code step linear. Below, the case where the first method is employed will be explained as an example.

Figure 14:
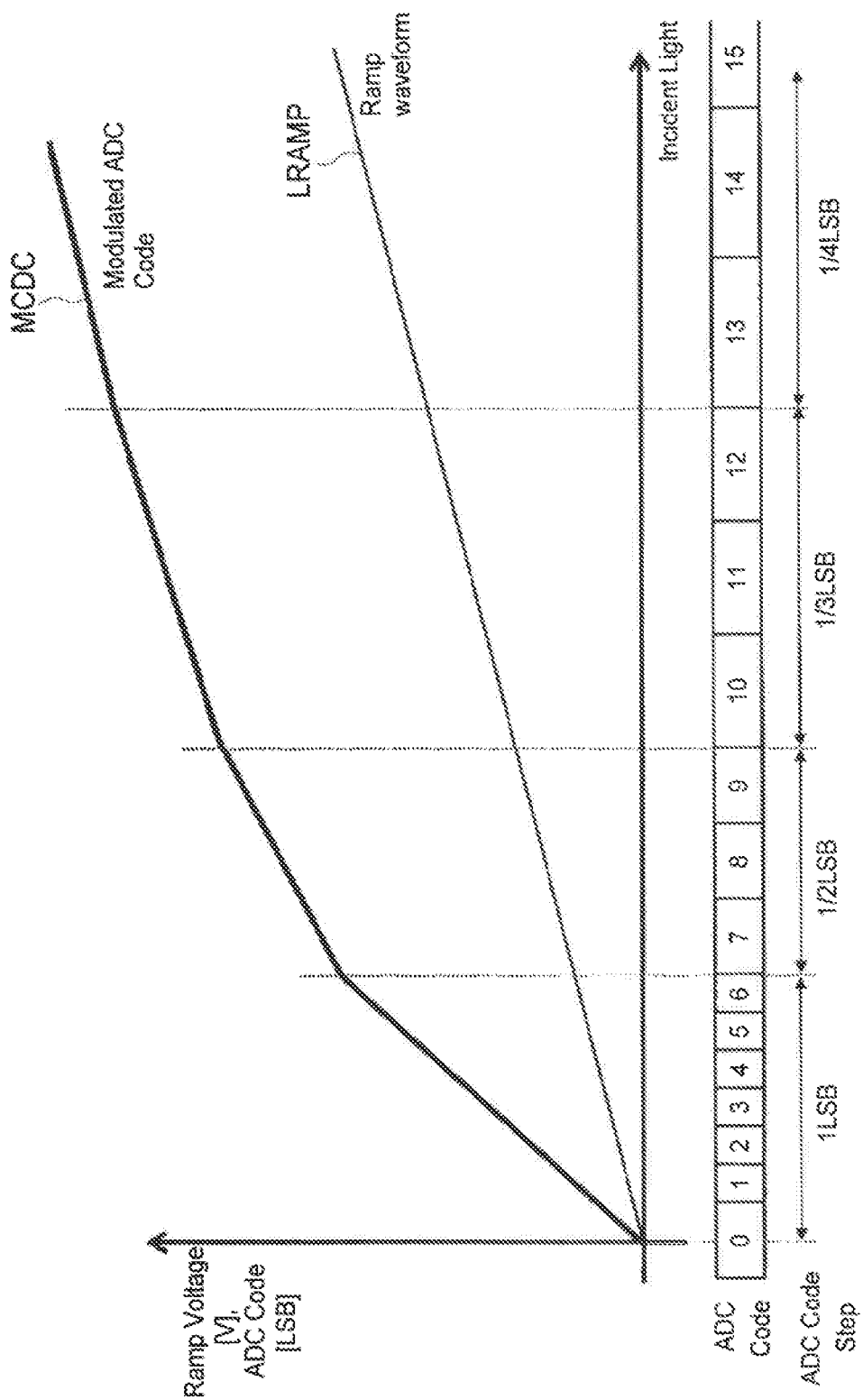
FIG. 14 is a view showing an example of a method for generating a modulated non-linear ramp shaped reference voltage while holding the ramp waveform linear and modulating an AD conversion code step.

FIG. 14 is a view showing an example of the method for generating the modulated non-linear ramp shaped reference voltage VREF-MR so that the ramp waveform is linear and the AD conversion code step is modulated. In the example in FIG. 14, the ramp waveform is linear (LRAMP), and the AD conversion code (ADC code) step is modulated to 1 LSB, ½ LSB, ⅓ LSB, and ¼ LSB to thereby generate the modulated AD conversion transfer curves (γ curves) MCDC.

Figure 15:
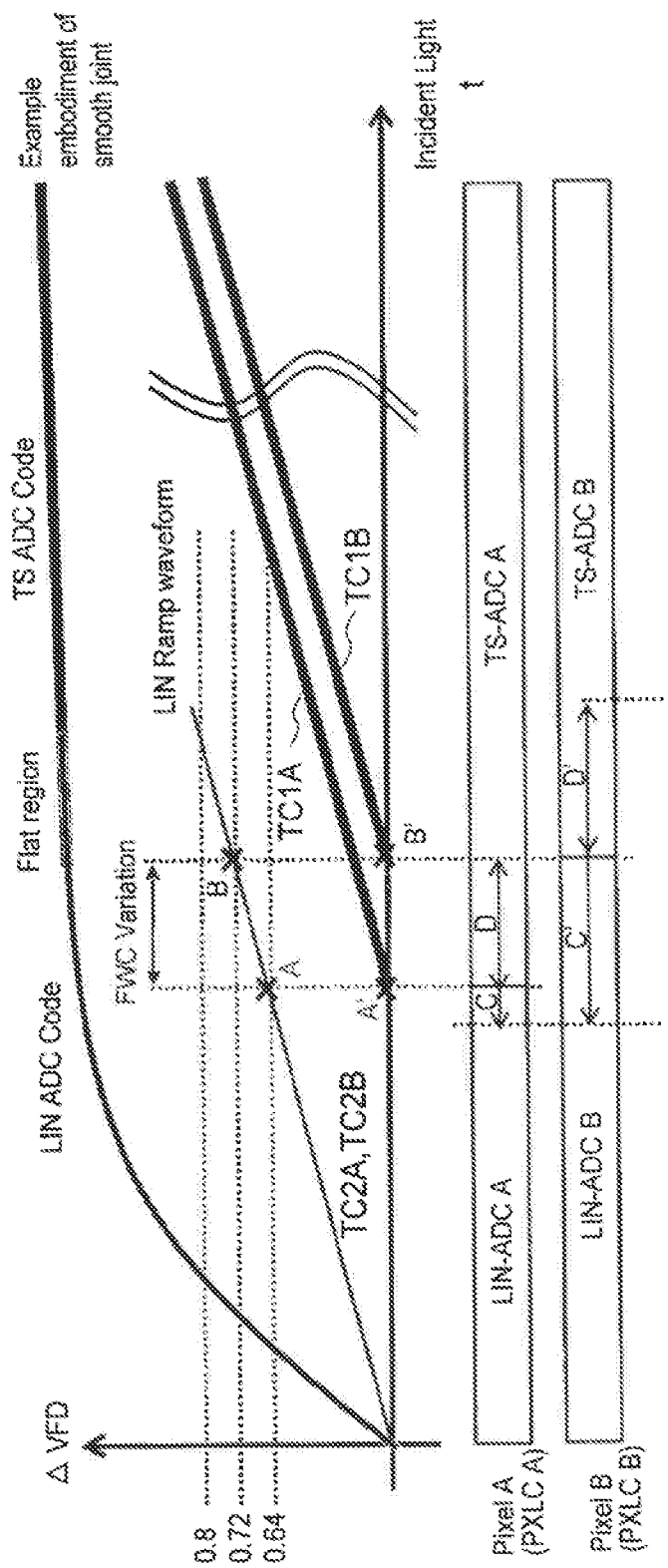
FIG. 15 is a view for explaining a second combinational processing method in the signal processing part where the reference voltage is a modulated non-linear ramp shaped reference voltage in the solid-state imaging device according to the embodiment.

FIG. 15 is a view for explaining the second combinational processing method in the signal processing part 710 in the case where the reference voltage is the modulated non-linear ramp shaped reference voltage VREF-NR in the solid-state imaging device 10 according to the present embodiment.

Figures 16A, 16B, 16C:
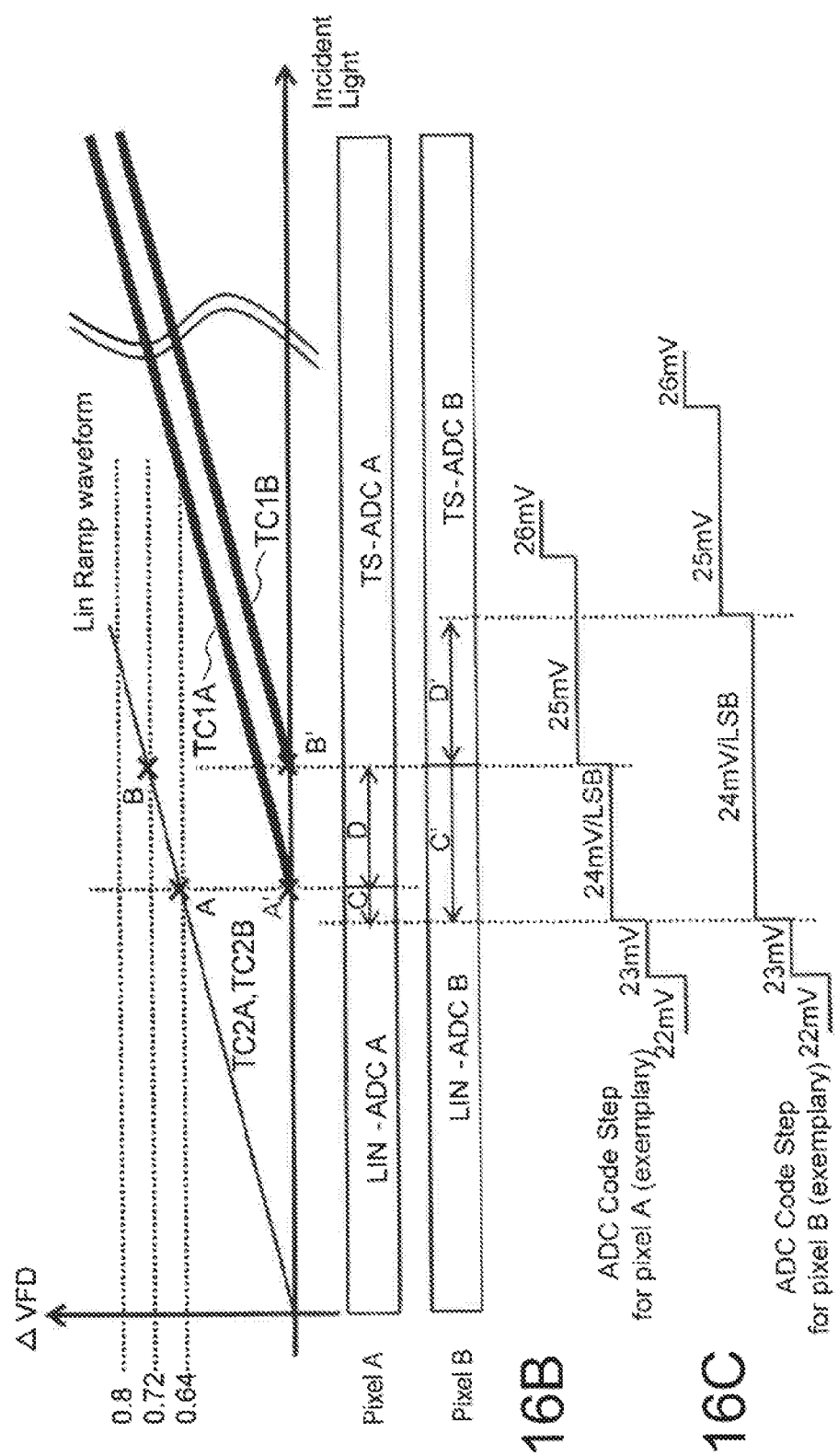
FIG. 16A to FIG. 16C are views for explaining the second combinational processing method in the signal processing part where the reference voltage is a modulated non-linear ramp shaped reference voltage in the solid-state imaging device according to the embodiment and are views shown including the AD conversion code step.

FIG. 16A to FIG. 16C are views for explaining the second combinational processing method in the signal processing part 710 in the case where the reference voltage is the modulated non-linear ramp shaped reference voltage VREF-MR in the solid-state imaging device 10 according to the present embodiment and are views including the AD conversion code step. In FIG. 15 and FIG. 16A, an abscissa indicates the quantity of the incident light and time, and an ordinate indicates the voltage level VFD of the floating diffusion FD1 as the output node.

In FIG. 15 and FIG. 16A as well, in the same way as FIG. 13, the case where the first AD conversion transfer curve TC1A and the second AD conversion transfer curve TC2A of the pixel PXLC-A are joined and combined and the case where the first AD conversion transfer curve TC1B and the second AD conversion transfer curve TC2B of the pixel PXLC-B are joined and combined are shown in parallel. In FIG. 15 and FIG. 16A, A indicates the maximum AD conversion code as the FWC information of the second AD conversion transfer curve TC2A in the joining part of the pixel PXLC-A, and A' indicates the minimum AD conversion code as the FWC information of the first AD conversion transfer curve TC1A in the joining part of the pixel PXLC-A. In FIG. 15 and FIG. 16A, B indicates the maximum AD conversion code as the FWC information of the second AD conversion transfer curve TC2B in the joining part of the pixel PXLC-B, and B' indicates the minimum AD conversion code as the FWC information of the first AD conversion transfer curve TC1B in the joining part of the pixel PXLC-B.

In FIG. 15 and FIG. 16A, a region C is the minimum AD conversion code step region of the pixel PXLC-A in a case of the LIN-ADC phase. A region C' is the lowest AD conversion code step region of the pixel PXLC-B in the case of the LIN-ADC phase. Usually, the region C is not equal to the region C' due to fluctuation of the FWC. A region D is a high AD conversion code step region of a pixel PXLC-A with respect to a TS-ADC phase, and D' is a high AD conversion code step region of the pixel PXLC-B. Usually, D is not equal to D'.

In the case where the reference voltage is the modulated non-linear ramp shaped reference voltage VREF-MR, the step size (mV/LSB) is not a single size, but may continuously change. Accordingly, adjustment of offset is not enough to make smooth joining possible. It is necessary to adjust the gain thereof, that is, the step size as well. This non-linear gain correction is carried out by digital-to-digital re-conversion (DDC).

That is, in the case where the reference voltage is the modulated non-linear ramp shaped reference voltage VREF-MR, not only the offset, but also the code step of AD conversion are different. Accordingly, in order to realize smooth joining, it is necessary to correct not only the offset, but also the code step of AD conversion.

FIG. 17A to FIG. 17C are views showing an example of the digital-to-digital re-conversion processing according to an embodiment of the present invention.

In the case where the FWC of each pixel is known, a correction coefficient for each pixel of the digital region may be used to correctly re-convert the AD conversion code and make it match with the target AD conversion code step. This DDC correction is basically necessary in the case of a modulated ramp shaped voltage. In actuality, it is used for reducing an ADC resolution of an HDR image sensor.

In the examples in FIG. 16A to FIG. 16C and FIG. 17A to FIG. 17C, the desired (ideal) AD conversion code step increases in steps to 2 mV/LSB, 23 mV/LSB, and 24 mV/LSB in the second AD conversion transfer curve TC2 in the region in the vicinity of the joining part. At the switching position (or timing) P2, in the first AD conversion transfer curve TC1, it switches from 24 mV/LSB to 25 mV/LSB and then increases in step to 26 mV/LSB.

The AD conversion code step of the pixel PXLC-A increases in steps to 22 mV/LSB, 23 mV/LSB, and 24 mV/LSB in the second AD conversion transfer curve TC2A in the region in the vicinity of the joining part, switches from 24 mV/LSB to 25 mV/LSB at the position P1 before the switching position P2, and then increases in step up to 26 mV/LSB at the position P4 in the first AD conversion transfer curve TC1A. This does not become a smooth joining region.

Therefore, non-linear gain correction is carried out concerning the pixel PXLC-A in the digital-to-digital re-conversion processing (DDC). A non-linear gain correction shifting the switching position from 24 mV/LSB to 25 mV/LSB from P1 to P2 and performing switching from 25 mV/LSB to 26 mV/LSB not at the position P4, but at the position P5 is carried out.

The AD conversion code step of the pixel PXLC-B increases in steps to 22 mV/LSB, 23 mV/LSB, and 24 mV/LSB in the second AD conversion transfer curve TC2B in the region in the vicinity of the joining part, switches from 24 mV/LSB to 25 mV/LSB in the first AD conversion transfer curve TC1B at the position P3 after the switching position P2, and then increases in step to 26 mV/LSB at a position P6. This does not become a smooth joining region.

Therefore, non-linear gain correction is carried out concerning the pixel PXLC-B in digital-to-digital re-conversion processing (DDC). Non-linear gain correction shifting the switching position from 24 mV/LSB to 25 mV/LSB from P3 to P2 and making switching from 25 mV/LSB to 26 mV/LSB not the position P6, but the position P4 is carried out.

As described above, in the case where the reference voltage is the modulated non-linear ramp shaped reference voltage VREF-MR, the signal processing part 710 performs the signal processing as follows. The signal processing part 710 performs offset adjustment shifting the minimum value of the first AD conversion transfer curve TC1 according to the first comparison processing CMPR1 in the joining part which is acquired to the maximum value of the second AD conversion transfer curve TC2 according to the second comparison processing CMPR2 in the joining part which is acquired and performs non-linear gain correction adjusting the gain corresponding to the step size by digital-to-digital re-conversion to thereby smoothly join the first AD conversion transfer curve TC1 and the second AD conversion transfer curve TC2. The signal processing part 710 shifts the minimum value of the AD conversion code according to the first comparison processing CMPR1 in the joining part which is acquired to the maximum value of the AD conversion code according to the second comparison processing CMPR2 in the joining part which is acquired and re-converts the AD conversion code in the digital region matching with the desired transfer curve in the digital-to-digital re-conversion to thereby smoothly join the first AD conversion transfer curve TC1 and the second AD conversion transfer curve TC2. Further, in the digital-to-digital re-conversion, it is also possible for the signal processing part 710 to perform the digital-to-digital re-conversion of the AD conversion code by using the correction coefficient related to the FWC information for each pixel in the digital region.

Third Combinational Processing Method

Next, a third combinational processing method in the signal processing part 710 applying digital-to-digital re-conversion processing in the case where the reference voltage is the linear ramp shaped reference voltage VREF-LR will be explained.

Figure 18A:
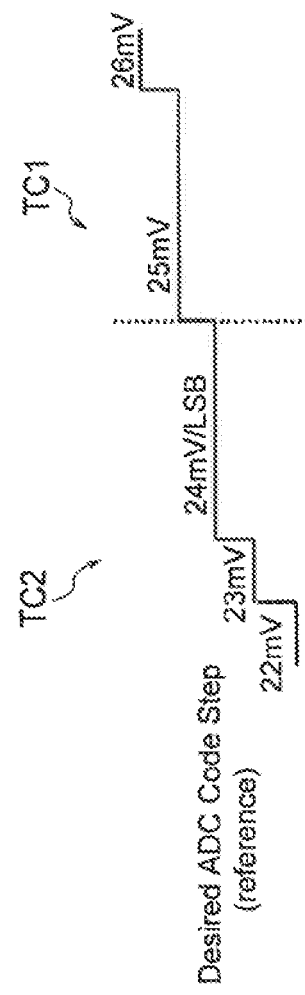
FIG. 18A and FIG. 18B are views showing another example of the digital-to-digital re-conversion processing according to the embodiment of the present invention and are views for explaining a third combinational processing method in the signal processing part to which the digital-to-digital re-conversion processing is applied when the reference voltage is a linear ramp shaped reference voltage.
Figure 18B:
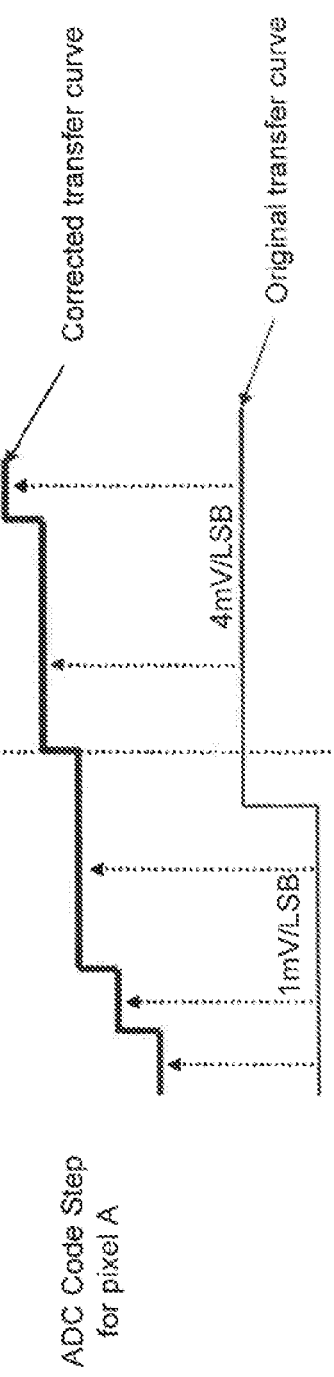

FIG. 18A and FIG. 18B are views for explaining another example of the digital-to-digital re-conversion processing according to this embodiment of the present invention and explaining a third combinational processing method in the signal processing part 710 applying the digital-to-digital re-conversion processing in the case where the reference voltage is the linear rasp shaped reference voltage VREF-LR.

The digital-to-digital re-conversion (DDC) technique explained above can be applied also to the LIN-ADC region. In the case of the example in FIG. 18A and FIG. 18B, the code step is a linear ramp of 1 mV/LSB in the LIN-ADC region and is a linear ramp of 4 mV/LSB in the TS-ADC region. By applying digital-to-digital re-conversion (DDC) to the first AD conversion transfer curve TC1 according to the first comparison processing CMPR1 and to the second AD conversion transfer curve TC2 according to the second comparison processing CMPR2, the ADC resolution can be compressed.

The signal processing part 710 performs offset adjustment shifting the minimum value of the first AD conversion transfer curve TC1 according to the first comparison processing CMPR1 in the joining part which is acquired to the maximum value of the second AD conversion transfer curve TC2 according to the second comparison processing CMPR2 in the joining part which is acquired and performs non-linear gain correction adjusting the gain corresponding to the step size by digital-to-digital re-conversion to thereby smoothly join the first AD conversion transfer curve TC1 and the second AD conversion transfer curve TC2. The signal processing part 710 shifts the minimum value of the AD conversion code according to the first comparison processing CMPR1 in the joining part which is acquired to the maximum value of the AD conversion code according to the second comparison processing CMPR2 in the joining part which is acquired and re-converts the AD conversion code in the digital region matching with the desired transfer curve in the digital-to-digital re-conversion to thereby smoothly join the first AD conversion transfer curve TC1 and the second AD conversion transfer curve TC2. Further, in the digital-to-digital re-conversion, it is also possible for the signal processing part 710 to perform the digital-to-digital re-conversion of the AD conversion code by using the correction coefficient related to the FWC information for each pixel in the digital region.

By applying the first combinational processing method, the second combinational processing method, and the third combinational processing method described above, irrespective of large fluctuation of the FWC, it is possible to realize smooth joining at the boundary of the two AD conversion transfer curves by re-converting the AD conversion codes in the digital region matching with the desired overall transfer curve.

Figure 19:
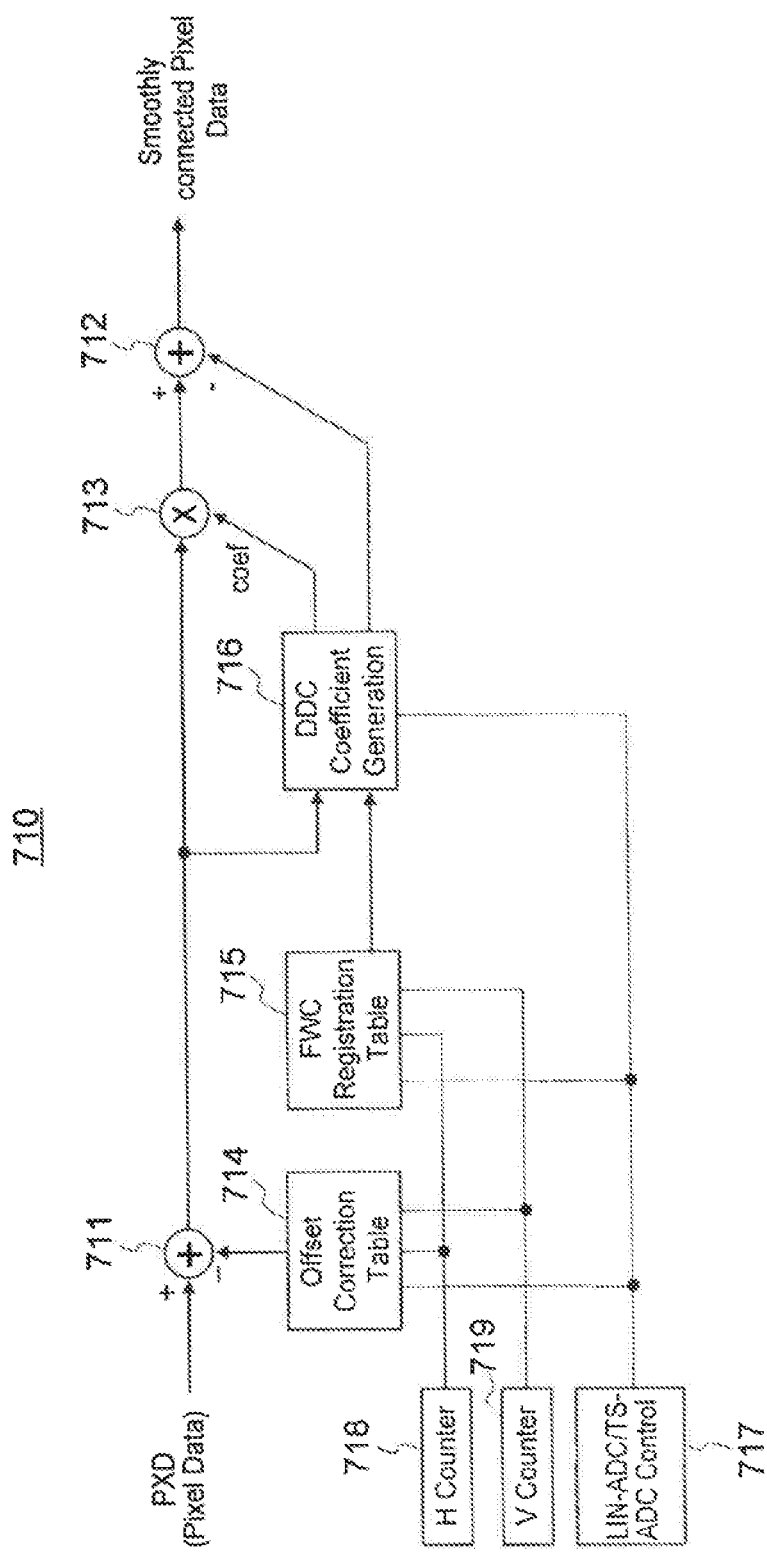
FIG. 19 is a view showing an example of the configuration of the signal processing part according to the embodiment.
Figure 20:
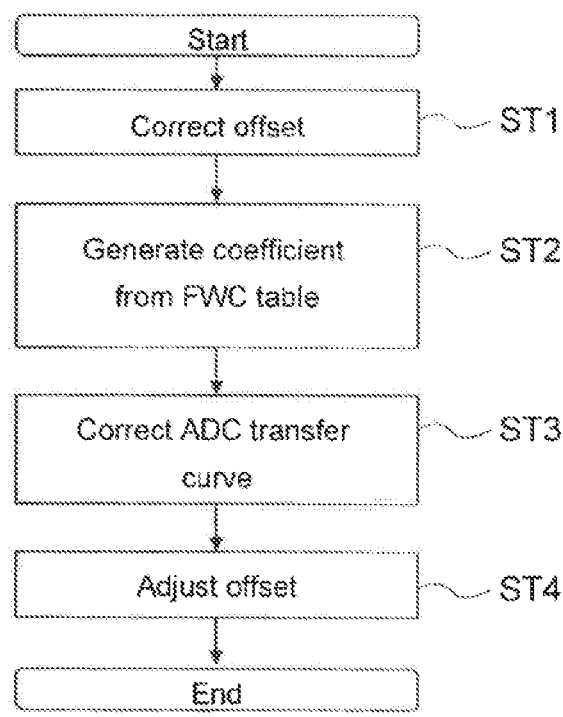
FIG. 20 is a flow chart for explaining an outline of operation in the signal processing part in FIG. 19.

FIG. 19 is a view showing an example of the configuration of the signal processing part 710 according to the present embodiment. FIG. 20 is a flow chart for explaining an outline of the operation in the signal processing part 710 in FIG. 19.

The signal processing part 710 in FIG. 19 is configured including adders (subtractors) 711 and 712, a multiplier 713, an offset correction table 714, an FWC registration table 715, a digital-to-digital re-conversion (DDC) coefficient generation part 716, a control part 717, a horizontal (H) counter 718, and a vertical (V) counter 719.

First, in the adder 711, the offset correction table 714 is referred to and the offset is subtracted from the pixel data PXD (step ST1). The DDC coefficient is generated by the DDC coefficient generation part 716 by using information in the FWC registration table 715 using H and V information (step ST2). In this case, it is generated according to whether the data is the LIN-ADC data or TS-ADC data. Next, in the multiplier 713, the offset-corrected pixel data is multiplied by the coefficient and the AD conversion transfer curve is corrected (step ST3). After that, the offset is added in the adder 712 (step ST4), and the image data smoothly joined at the joining border of the two AD conversion transfer curves is output.

Stacked Structure of Solid-State Imaging Device 10

Next, the stacked structure of the solid-state imaging device 10 according to the first embodiment will be explained.

Figure 22:
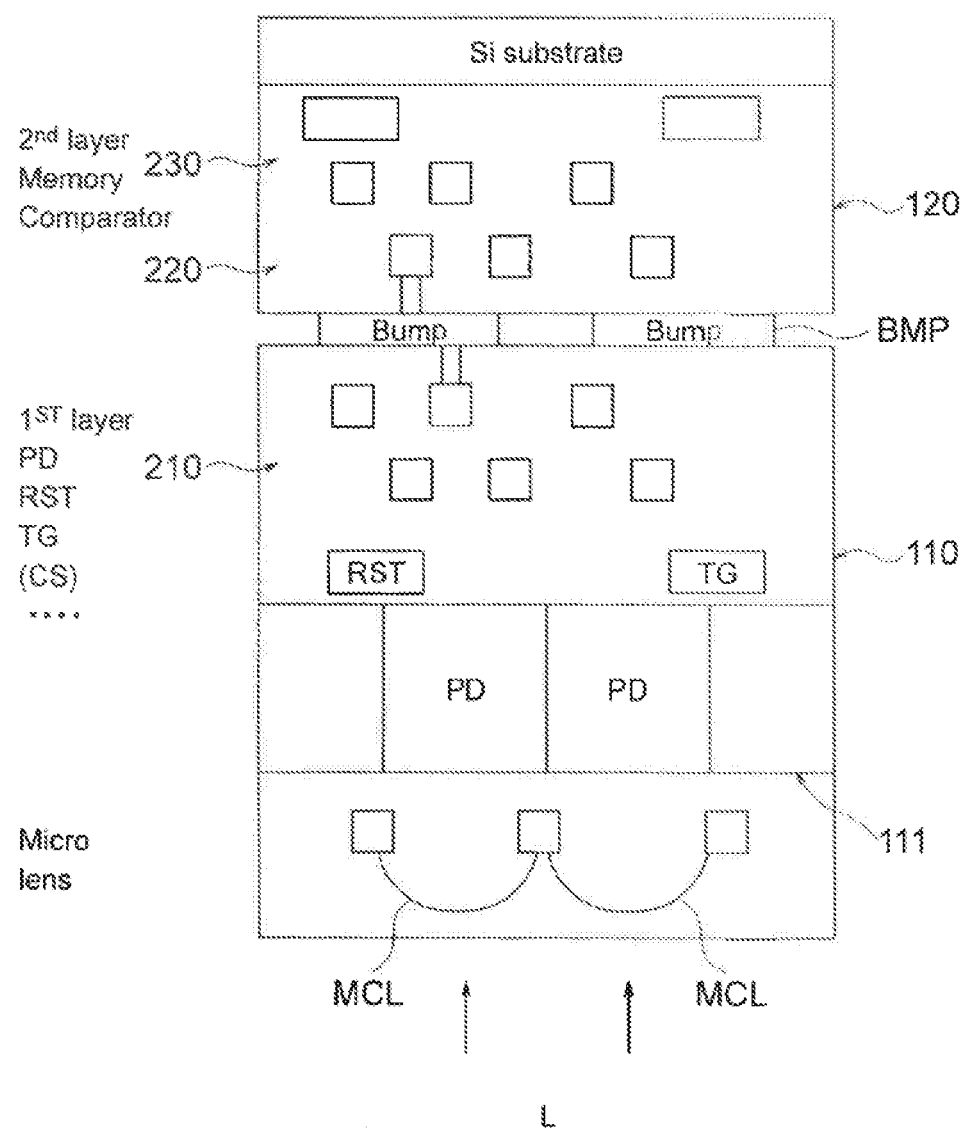
FIG. 22 is a schematic cross-sectional view for explaining the stacked structure of the solid-state imaging device according to the first embodiment.

FIG. 21A and FIG. 21B are schematic views for explaining the stacked structure of the solid-state imaging device 10 according to the first embodiment. FIG. 22 is a simplified view for explaining the stacked structure of the solid-state imaging device 10 according to the first embodiment.

The solid-state imaging device 10 according to the first embodiment has a stacked structure of a first substrate (upper substrate) 110 and a second substrate (lower substrate) 120. The solid-state imaging device 10 is for example formed as an image capturing device having a stacked structure obtained by bonding the substrates to each other at a wafer level and cutting them by dicing. In the present example, the device has a structure of the first substrate 110 and the second substrate 120 which are stacked.

On the first substrate 110, the photoelectric converting and reading parts 210 of the digital pixels 200 in the pixel part 20 are formed centered about its center part. The photodiodes PD1 are formed on the first surface 111 side of the first substrate 110 which is the side where the light L is incident, and microlenses MCL and color filter are formed on the light incident side. On the second surface side of the first substrate 110, the transfer transistor TG1-Tr, the reset transistor RST1-Tr, the source follower transistor SF1-Tr, and the current transistor IC1-Tr are formed.

In this way, in the first embodiment, basically the photoelectric converting and reading parts 210 of the digital pixels 200 are formed in a matrix on the first substrate 110.

On the second substrate 120, AD conversion parts 220 and memory parts 230 of the digital pixels 200 are formed in a matrix. Further, the vertical scanning circuit 30, the output circuit 40, and the timing control circuit 50 may be formed on the second substrate 120 as well.

In such a stacked structure, the read-out nodes ND2 of the photoelectric converting and reading parts 210 on the first substrate 110 and the inverted input terminals (−) of the comparators 221 in the digital pixels 200 on the second substrate 120 are individually electrically connected using the signal line LSGN1, micro bumps BMP, vias (die-to-die vias), and the like as shown in for example FIG. 3. Further, in the present embodiment, the read-out nodes ND2 of the photoelectric converting and reading parts 210 on the first substrate 110 and the inverted input terminals (−) of the comparators 221 in the digital pixels 200 on the second substrate 120 are AC-coupled by coupling capacitors C221.

Reading Operation of Solid-State Imaging Device 10

The characteristic configurations and functions of the parts in the solid-state imaging device 10 were explained above. Next, basic reading operation etc. of the pixel signals of the digital pixels 200 in the solid-state imaging device 10 according to the first embodiment will be explained.

Figure 23:
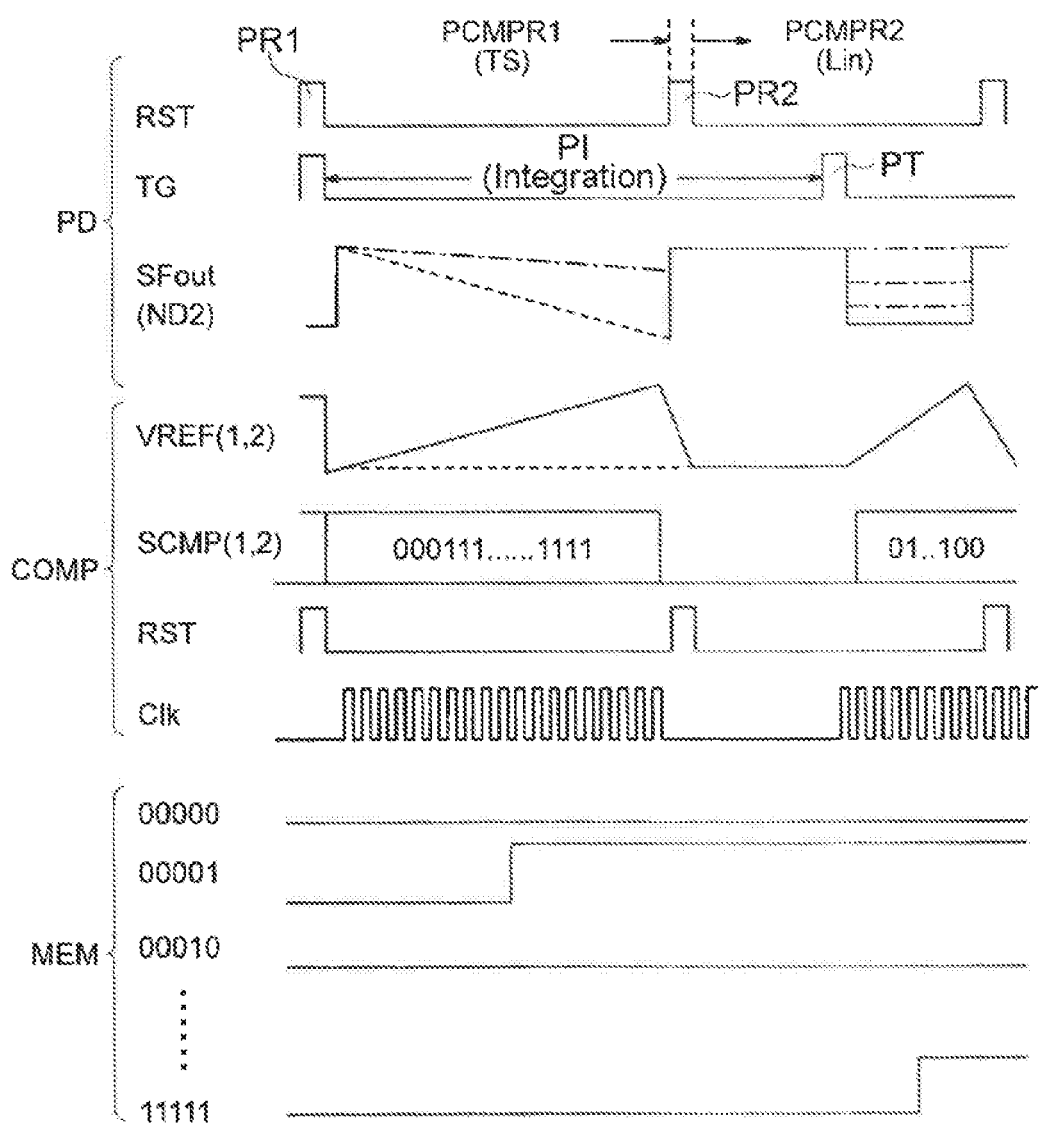
FIG. 23 is a timing chart for mainly explaining the reading operation in the pixel part at the time of a predetermined shutter mode in the solid-state imaging device according to the first embodiment.

FIG. 23 is a timing chart for mainly explaining the reading operation in the pixel part at the time of a predetermined shutter mode of the solid-state imaging device according to the first embodiment. FIG. 24A to FIG. 24D are views showing operation sequences and potential transitions for mainly explaining the reading operation in the pixel part at the time of a predetermined shutter mode in the solid-state imaging device according to the first embodiment.

Figure 24:
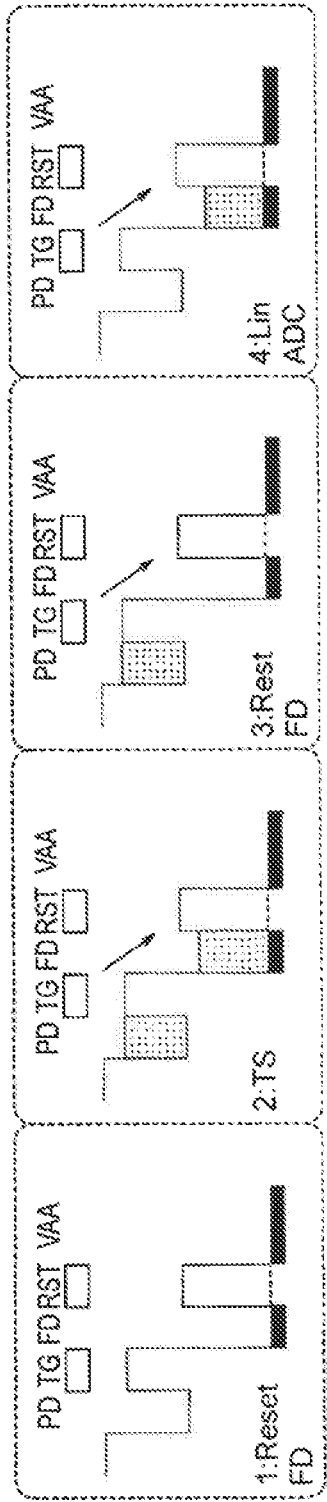
FIG. 24A to FIG. 24D are views showing the operation sequences and potential transitions for mainly explaining the reading operation in the pixel part at the time of a predetermined shutter mode in the solid-state imaging device according to the first embodiment.

First, at the start of the reading operation, as shown in FIG. 23 and FIG. 24A, a global reset resetting the photodiodes PD1 and floating diffusions FD in the digital pixels 200 is carried out. In the global reset, the reset transistor RST1-Tr and transfer transistor TG1-Tr are held in a conductive state for a predetermined period simultaneously for all pixels and the photodiodes PD1 and floating diffusions FD1 are reset. Further, the reset transistor RST1-Tr and transfer transistor TG1-Tr are switched to a non-conductive state simultaneously for all pixels, and exposure, that is, accumulation of charge, is started simultaneously and in parallel for all pixels.

Further, as shown in FIG. 23 and FIG. 24B, the operation of time stamp (TS) ADC mode with respect to the overflow charge is started. The overflow charges are accumulated in the floating diffusions FD1 in the integration period PI. The time stamp ADC mode operates in the integration time PI, specifically in a period in the integration period PI up to reset of the floating diffusions FD1.

In the time stamp (TS) ADC mode, in the photoelectric converting and reading part 210, corresponding to the first comparison processing period PCMPR1 of the AD conversion part 220, a voltage signal VSL1 corresponding to the overflow charge overflowing from the photodiode PD1 to the floating diffusion FD1 as the output node in the integration period PI is output. Further, in the comparator 221 of the AD conversion part 220, the first comparison processing CMPR1 is carried out. In the comparator 221, under the control of the reading part 60, the digitized first comparison result signal SCMP1 with respect to the voltage signal VSL1 corresponding to the overflow charge overflowing from the photodiode PD1 to the floating diffusion FD1 as the output node in the period in the integration period PI up to the reset of the floating diffusion FD1 is output, and the digital data corresponding to the first comparison result signal SCMP1 is stored in the memory 231 of the memory part 230.

Next, as shown in FIG. 23 and FIG. 24C, the operation of the time stamp (TS) ADC mode with respect to the overflow charge ends and the mode transits to the linear ADC mode and the operation shifts to the reset period PR2 of the floating diffusion FD1. In the reset period PR2, the reset transistor RST1-Tr is held in a conductive state for a predetermined period and the floating diffusion FD1 is reset. The signal at the time of reset of the floating diffusion FD1 (VRST) is read out and the digital signal is stored in the memory 232 of the memory part 230. Further, the reset transistor RST1-Tr is switched to a non-conductive state. In this case, the integration period PI is continued.

Next, as shown in FIG. 23 and FIG. 24D, the integration period PI ends and the operation shifts to the transfer period PT. In the transfer period PT, the transfer transistor TG1-Tr is held in a conductive state for a predetermined period and the accumulated charge in the photodiode PD1 is transferred to the floating diffusion FD1.

In the linear (Lin,LIN) ADC mode, in the photoelectric converting and reading part 210, corresponding to the second comparison processing period PCMPR2 of the AD conversion part 220, after the end of the integration period PI, a voltage signal VSL2 corresponding to the accumulated charge transferred from the photodiode PD1 to the floating diffusion FD1 as the output node is output. Further, in the comparator 221 of the AD conversion part 220, the second comparison processing CMPR2 is carried out. In the comparator 221, under the control of the reading part 60, after the integration period PI, a digitized second comparison result signal SCMP2 with respect to the voltage signal VSL2 corresponding to the accumulated charge transferred from the photodiode PD1 to the floating diffusion FD1 as the output node is output and the digital data corresponding to the second comparison result signal SCMP2 is stored in the memory 232 of the memory part 230.

The signal read out to the memory part 230 is executed by reading the digital signal data from the memory node. It has an MIPI data format and is, for example, sent to the DSP part 70 of the solid-state imaging device 10 (image sensor) through the IO buffer 41 of the output circuit 40. This operation can be globally executed with respect to the entire pixel array.

In the DSP part 70, after CDS, black correction, digital gain, and other image signal processing are applied with respect to the input digital signals, the results are output adapted to the output model in for example the SLVS interface part. At this time, in the DSP part 70, the signal processing part 710 performs combinational processing applying the FWC information of the pixel which is measured and correcting the joining gap between the AD conversion transfer curve TC1 corresponding to the first comparison processing CMPR1 and the second AD conversion transfer curve TC2 corresponding to the second comparison processing CMPR2 and combines the two signals to thereby generate a high dynamic range signal expanded in the dynamic range.

As explained above, according to the first embodiment, the solid-state imaging device 10 is configured as for example a stacked type CMOS image sensor including, in the pixel part 20, digital pixels of the photoelectric converting and reading parts 210, the AD conversion parts 220, and the memory parts 230 and having an global shutter operation function. In the solid-state imaging device 10 according to the first embodiment, each digital pixel 200 has an AD conversion function, and the AD conversion part 220 has a comparator 221 performing comparison processing comparing the voltage signal read out by the photoelectric converting and reading part 210 and a reference voltage and outputting a digitized comparison result signal. Further, under the control of the reading part 60, the comparator 221 performs first comparison processing CMPR1 outputting the digitized first comparison result signal SCMP1 with respect to the voltage signal corresponding to the overflow charge overflowing from the photodiode PD1 to the output node (floating diffusion) FD1 in the integration period and the second comparison processing CMPR2 outputting the digitized second comparison result signal SCMP2 with respect to the voltage signal corresponding to the accumulated charge of the photodiode PD1 transferred to the floating diffusion FD1 (output node) in the transfer period after the integration period. Further, the signal processing part 710 of the DSP part 70 performs combinational processing applying the FWC information of the pixel which is measured and correcting the joining gap between the first AD conversion transfer curve TC1 corresponding to the first comparison processing CMPR1 and the second AD conversion transfer curve TC2 corresponding to the second comparison processing CMPR2 to thereby generate a high dynamic range signal expanded in the dynamic range.

Accordingly, according to the solid-state imaging device 10 of the first embodiment, the charges overflowing from the photodiodes in the integration period are utilized in real time to thereby enable smooth switching (connection) of a plurality of signals to be combined, therefore it becomes possible to suppress deterioration of the image while realizing a much broader dynamic range and higher frame rate. Further, according to the present invention, it is possible to substantially realize a broader dynamic range and higher frame rate and in addition possible to lower noise, possible to expand the effective pixel region to the maximum limit, and possible to raise the value relative to the cost to the maximum limit.

Further, according to the solid-state imaging device 10 of the first embodiment, irrespective of a large fluctuation of the FNC, it is possible to realize a smooth joining at the boundary of the two AD conversion transfer curves by re-converting the AD conversion codes in the digital region matching with the desired overall transfer curve.

Further, according to the solid-state imaging device 10 of the first embodiment, it is possible to prevent complication of the configuration while preventing a drop in the area efficiency in layout.

Further, the solid-state imaging device 10 according to the first embodiment has a stacked structure of the first substrate (upper substrate) 110 and second substrate (lower substrate) 120. Accordingly, in the first embodiment, basically, by forming the first substrate 110 side by only the NMOS system elements and by expanding the effective pixel region to the maximum limit by the pixel array, the value relative to the cost can be raised to the maximum limit.

Second Embodiment

Figure 25:
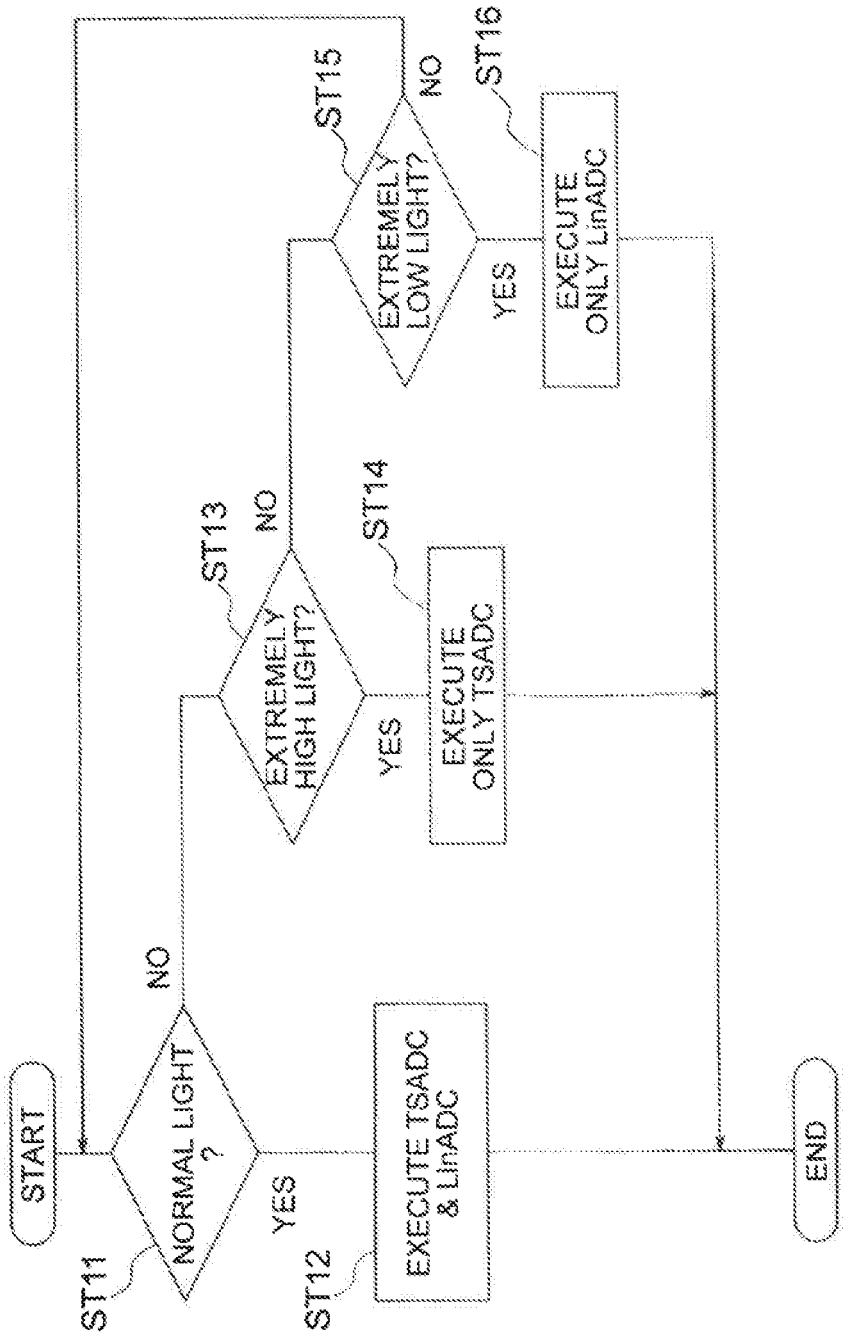
FIG. 25 is a view for explaining a solid-state imaging device according to a second embodiment of the present invention and a view showing an example of selection processing of a time stamp ADC mode operation and linear ADC mode operation.

FIG. 25 is a view for explaining a solid-state imaging device according to a second embodiment of the present invention and is a view showing an example of selection processing of a time stamp ADC mode operation and linear ADC mode operation.

The difference of a solid-state imaging device 10A according to the second embodiment from the solid-state imaging device 10 according to the first embodiment explained above is as follows. In the solid-state imaging device 10 according to the first embodiment, the time stamp (TS) ADC mode operation and the linear (Lin) ADC mode operation are successively carried out.

Contrary to this, in the solid-state imaging device 10A according to the second embodiment, the time stamp (TS) ADC mode operation and the linear (Lin) ADC mode operation can be selectively carried out corresponding to the light.

In the example in FIG. 25, in a case of normal light (ST11), the time stamp ADC mode operation and the linear ADC mode operation are continuously carried out (ST12).

In a case where the light is not normal but is very (extremely) high (ST11, ST13), the probability of overflowing of the charge from the photodiode PD1 to the floating diffusion FD1 is high, therefore only the time stamp ADC mode operation is carried out (ST14). In a case where the light is not normal, not very (extremely) high either, but very (extremely) low (ST11, ST13, ST15), the probability of overflowing of the charge from the photodiode PD1 to the floating diffusion FD1 is extremely low, therefore only the linear ADC mode operation is carried out (ST16).

According to the second embodiment, the same effect as the effect by the first embodiment explained above can be obtained of course. Also, it becomes possible to raise the speed of read-out processing and lower the power consumption.

Third Embodiment

Figure 26:
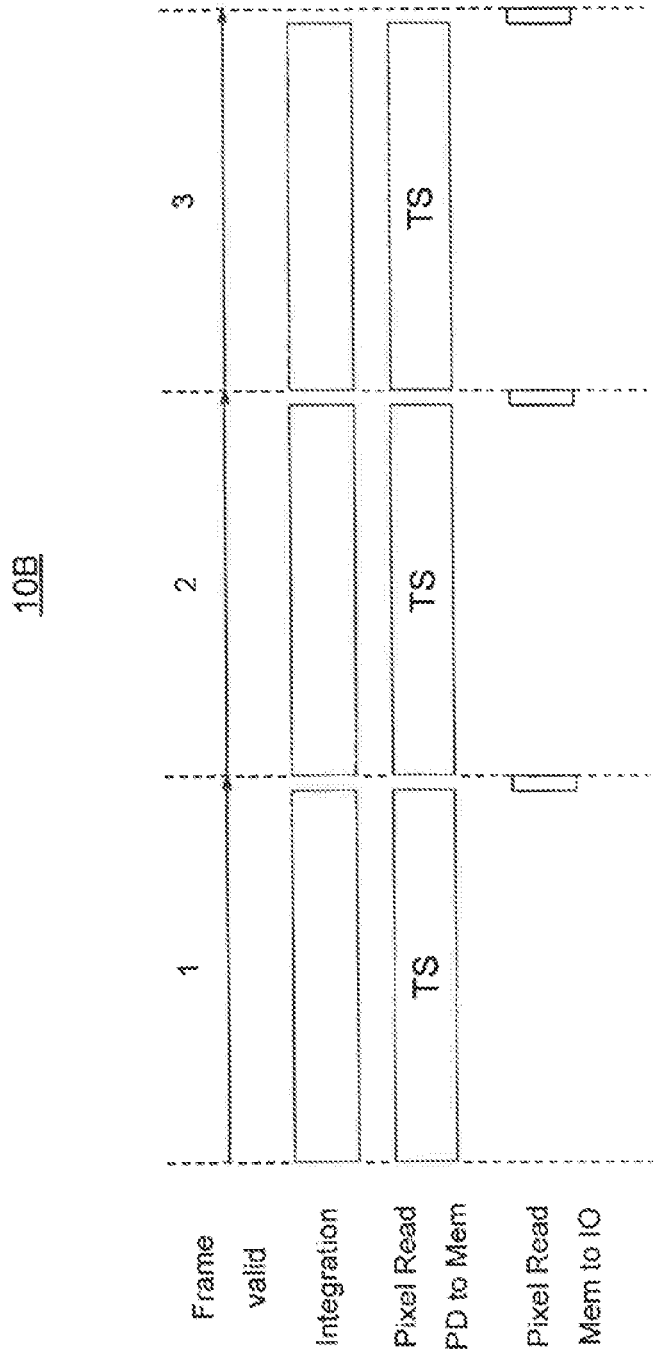
FIG. 26 is a view showing an example of a frame read out sequence in a solid-state imaging device according to a third embodiment of the present invention.
Figure 27:
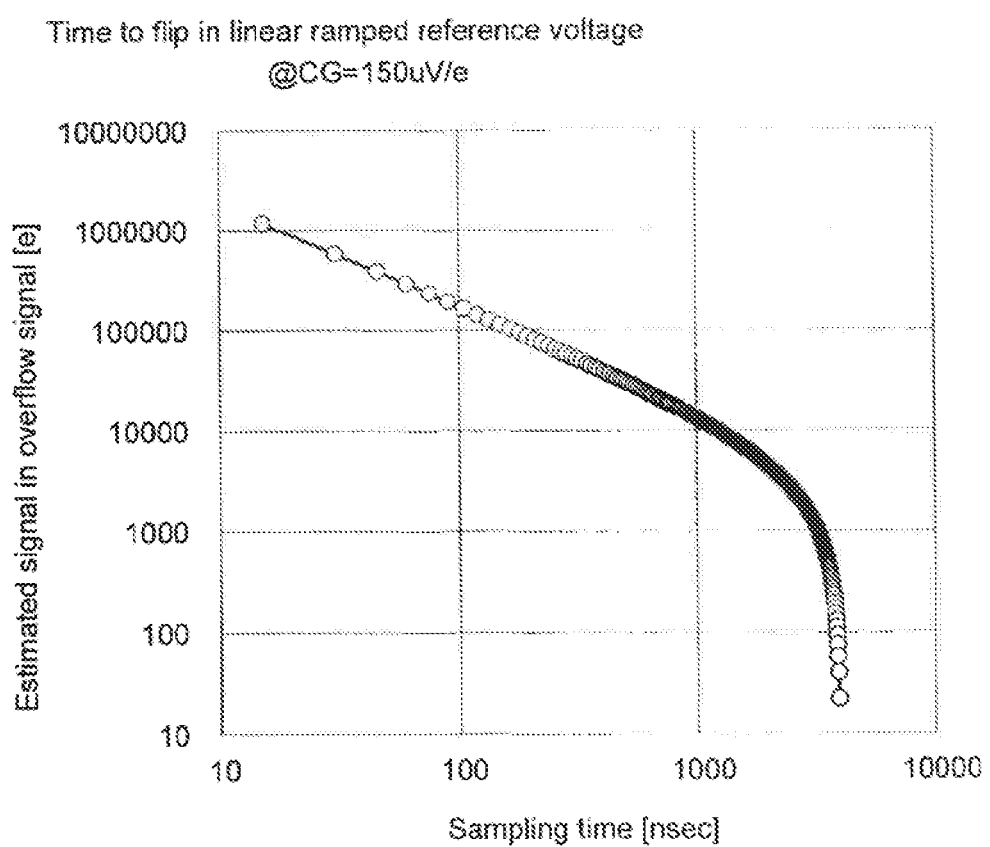
FIG. 27 is a view showing a state of light-to-time conversion where a reference voltage is input to a comparator according to the third embodiment.
Figure 28B:
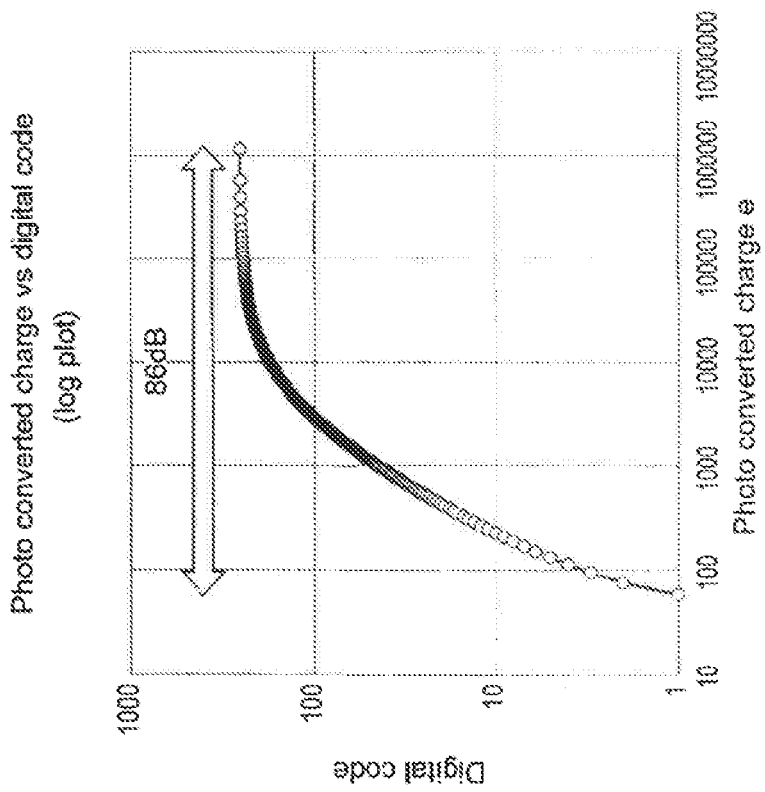
FIG. 28A and FIG. 28B are views showing relationships between a digital code and a charge amount according to light conversion in the third embodiment.
Figure 28A:
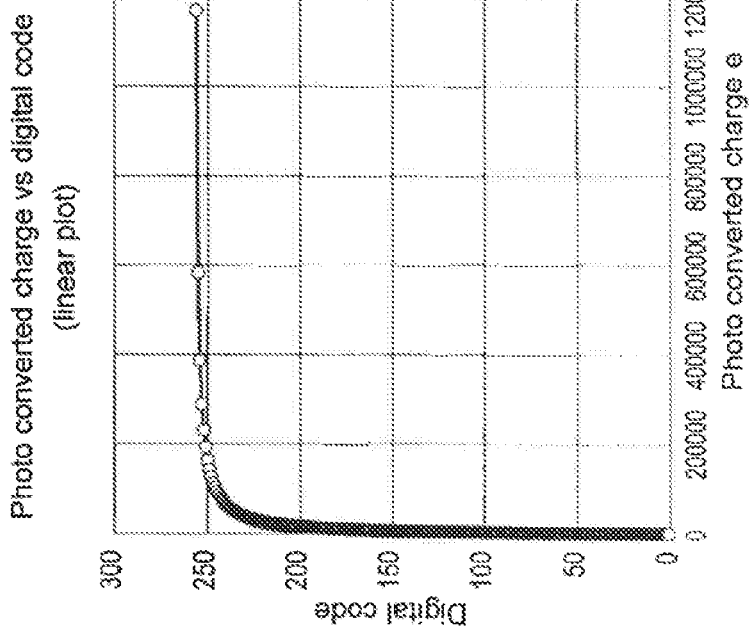

FIG. 26 is a view showing an example of a frame read out sequence in a solid-state imaging device 10B according to a third embodiment of the present invention. FIG. 27 is a view showing a state of light-to-time conversion where the reference voltage is input to a comparator according to the third embodiment. In FIG. 27, an abscissa indicates a sampling time, and an ordinate indicates the estimated signal in the overflow signal. Note that, the "overflow signal" referred to here is estimated by rendering the transfer transistor TG1-Tr the conductive state to set a condition where the charge is not accumulated in the photodiodes PD1 (non-overflow). FIG. 27 shows a sampling time at which the comparator 221 inverts which corresponds to the non-overflow charge (signal) according to the nature (suitability) of the light applied. FIG. 28A and FIG. 28B are views showing the relationships between the digital codes and the quantities of charge according to the light conversion in the third embodiment. FIG. 28A shows the characteristic where use is made of the linear ramp signal, and FIG. 28B shows the characteristic where use is made of a log signal.

In the third embodiment, the reading part 60 controls the comparator 221 so as to output the digitized first comparison result signal SCMP1 with respect to the voltage signal VSL corresponding to the charge by the first comparison processing CMPR1 even if a charge does not overflow from the photodiode PD1 to the floating diffusion FD1 as the output node in the integration period.

In the third embodiment, good conversion processing can be realized and, depending on the case, a dynamic range performance of 86 dB can be realized.

Fourth Embodiment

Figure 29:
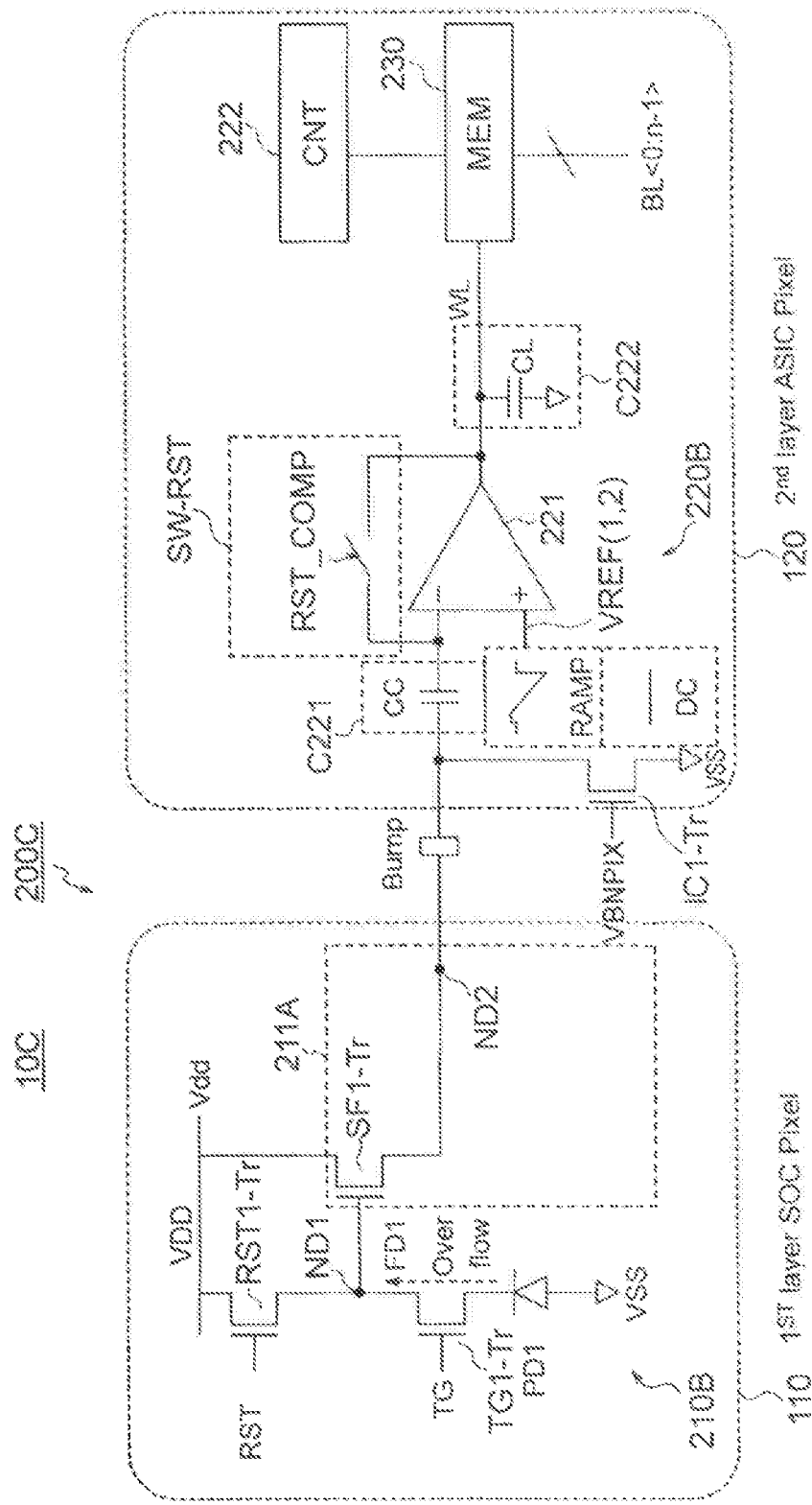
FIG. 29 is a circuit diagram showing an example of the pixel in a solid-state imaging device according to a fourth embodiment of the present invention.

FIG. 29 is a view showing an example of the configuration of a solid-state imaging device according to a fourth embodiment of the present invention.

The difference of a solid-state imaging device 10C according to the fourth embodiment from the solid-state imaging device 10 according to the first embodiment explained above is as follows. In the solid-state imaging device 10C according to the fourth embodiment, the current transistor IC1-Tr as the current source is arranged not on the first substrate 110 side, but on for example the input side of the AD conversion part 220 on the second substrate 120 side.

According to the fourth embodiment, the same effect as the effect by the first embodiment explained above can be obtained.

The solid-state imaging devices 10, 10A, 10B, and 10C explained above can be applied, as image capturing devices, to digital cameras, video cameras, portable terminals, or monitoring cameras, cameras for medical endoscopes, and other electronic apparatuses.

Figure 30:
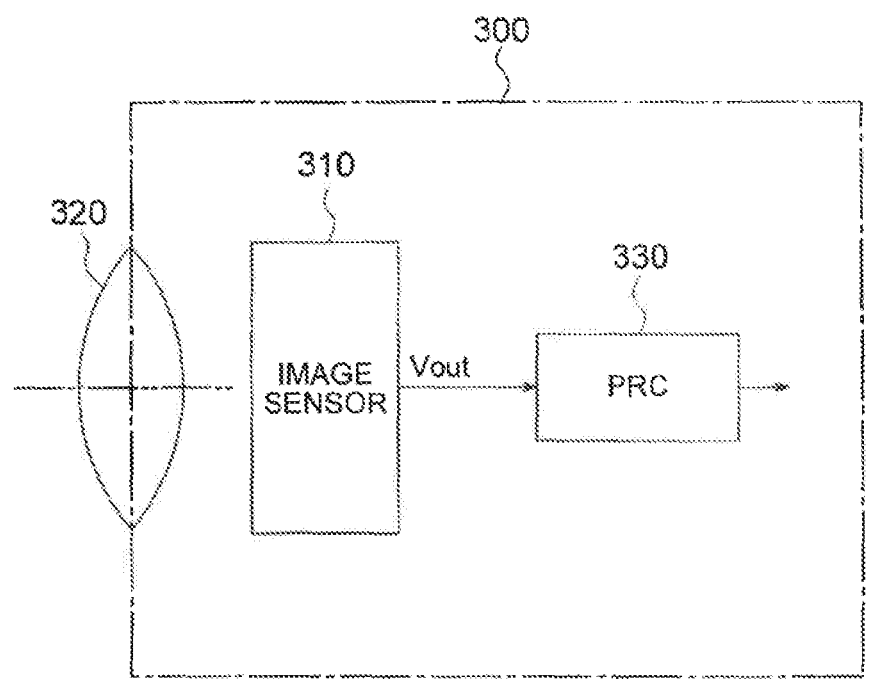
FIG. 30 is a view showing an example of the configuration of an electronic apparatus to which the solid-state imaging device according to an embodiment of the present invention is applied.

FIG. 30 is a view showing an example of the configuration of an electronic apparatus mounting a camera system to which the solid-state imaging device according to an embodiment of the present invention is applied.

The electronic apparatus 300, as shown in FIG. 30, has a CMOS image sensor 310 to which the solid-state imaging device 10 according to the present embodiment can be applied. Further, the electronic apparatus 300 has an optical system (lens etc.) 320 which guides incident light (forms a subject image) into a pixel region of this CMOS image sensor 310. The electronic apparatus 300 has a signal processing circuit (PRC) 330 for processing the output signals of the CMOS image sensor 310.

The signal processing circuit 330 applies predetermined signal processing with respect to the output signals of the CMOS image sensor 310. The image signal processed in the signal processing circuit 330 can be projected as a moving image onto a monitor formed by a liquid crystal display or the like or can be output to a printer. Further, it can be directly recorded in a recording medium such as a memory card. Various embodiments are possible.

As explained above, by mounting the solid-state imaging devices 10, 10A, 10B, and 10C explained before as the CMOS image sensors 310, it becomes possible to provide high performance, small-sized, and low-cost camera systems. Further, it is possible to realize for example monitoring cameras or cameras for medical endoscopes or other electronic apparatuses which are used for applications where there are restrictions in mounting size, number of connectable cables, cable length, installation height, etc. in requirements for camera installation.

What is claimed is:
1. A solid-state imaging device, comprising
a pixel part in which pixels for performing photoelectric conversion are arranged,
a reading circuit which reads out pixel signals from the pixels in the pixel part, and
a processor which combines a plurality of read-out signals to generate a combined signal having an expanded dynamic range, wherein
each pixel includes
a photodiode which accumulates a charge generated by photoelectric conversion in an integration period,
a transistor capable of transferring the charge accumulated in the photodiode in a transfer period after the integration period,
an output node to which the charge accumulated in the photodiode is transferred through the transistor,
an output buffer circuit which converts the charge at the output node to a voltage signal corresponding to a quantity of the charge and outputs the converted voltage signal,
a comparator which performs comparison processing for comparing the voltage signal of the output buffer circuit and a reference voltage and outputting a digitized comparison result signal, and
a memory part for storing data corresponding to the comparison result signal of the comparator,
the comparator, under control of the reading circuit, performs
a first comparison processing for outputting a digitized first comparison result signal with respect to the voltage signal corresponding to an overflow charge overflowing from the photodiode to the output node in the integration period and a second comparison processing for outputting a digitized second comparison result signal with respect to the voltage signal corresponding to the accumulated charge of the photodiode transferred to the output node in the transfer period after the integration period, and the processor performs combinational processing for joining a first analog-to-digital (AD) conversion transfer curve corresponding to the first comparison processing and a second AD conversion transfer curve corresponding to the second comparison processing.

2. The solid-state imaging device according to claim 1, wherein:

the processor, in the combinational processing, applies full well capacity (FWC) information of measured pixels and corrects a joining gap between the first AD conversion transfer curve and the second AD conversion transfer curve.

3. The solid-state imaging device according to claim 2, wherein:

the applied FWC information is at least FWC information obtained in the second comparison processing.

4. The solid-state imaging device according to claim 2, wherein:

the reference voltage input to the comparator is a linear ramp shaped reference voltage with a step size of a single value, and the processor performs offset adjustment for shifting a minimum value of the first AD conversion transfer curve according to the first comparison processing in the joining part which is acquired, to a maximum value of the second AD conversion transfer curve according to the second comparison processing in the joining part which is acquired, to thereby join the first AD conversion transfer curve and the second AD conversion transfer curve.

5. The solid-state imaging device according to claim 4, wherein:

the processor shifts a minimum AD conversion code of the first AD conversion transfer curve according to the first comparison processing in the joining part which is acquired, to a maximum AD conversion code of the second AD conversion transfer curve according to the second comparison processing in the joining part which is acquired, to thereby join the first AD conversion transfer curve and the second AD conversion transfer curve.

6. The solid-state imaging device according to claim 2, wherein:

the reference voltage input to the comparator is a modulated ramp shaped reference voltage with a step size which does not take a single value, but may continuously change, and the processor performs offset adjustment for shifting a minimum value of the first AD conversion transfer curve according to the first comparison processing in the joining part which is acquired, to a maximum value of the second AD conversion transfer curve according to the second comparison processing in the joining part which is acquired, and performs non-linear gain correction for adjusting a gain corresponding to the step size according to digital-to-digital re-conversion, to thereby join the first AD conversion transfer curve and the second AD conversion transfer curve.

7. The solid-state imaging device according to claim 6, wherein:

the processor shifts a minimum AD conversion code of the first AD conversion transfer curve according to the first comparison processing in the joining part which is acquired, to a maximum AD conversion code of the second AD conversion transfer curve according to the second comparison processing in the joining part which is acquired, and re-converts, in the digital-to-digital re-conversion, the minimum AD conversion code and the maximum AD conversion code in the digital region to match with a desired transfer curve to thereby join the first AD conversion transfer curve and the second AD conversion transfer curve.

8. The solid-state imaging device according to claim 7, wherein:

the processor performs the digital-to-digital re-conversion for the minimum AD conversion code and the maximum AD conversion code by using a correction coefficient related to the FWC information for each pixel of the digital region.

9. The solid-state imaging device according to claim 6, wherein:

the modulated ramp shaped reference voltage is generated so that a ramp waveform is linear and an AD conversion code step is modulated.

10. The solid-state imaging device according to claim 6, wherein:

the modulated ramp shaped reference voltage is generated by changing a ramp waveform and making an AD conversion code step linear.

11. The solid-state imaging device according to claim 2, wherein:

the reference voltage input to the comparator is a linear ramp shaped reference voltage with a step size of a single value, and the processor performs offset adjustment for shifting a minimum value of the first AD conversion transfer curve according to the first comparison processing in the joining part which is acquired, to a maximum value of the second AD conversion transfer curve according to the second comparison processing in the joining part which is acquired, and performs non-linear gain correction adjusting a gain corresponding to the step size according to digital-to-digital re-conversion, to thereby join the first AD conversion transfer curve and the second AD conversion transfer curve.

12. The solid-state imaging device according to claim 11, wherein:

the processor shifts a minimum AD conversion code of the first AD conversion transfer curve according to the first comparison processing in the joining part which is acquired, to a maximum AD conversion code of the second AD conversion transfer curve according to the second comparison processing in the joining part which is acquired, and re-converts, in the digital-to-digital re-conversion, the AD conversion code in the digital region to match with a desired transfer curve, to thereby join the first AD conversion transfer curve and the second AD conversion transfer curve.

13. The solid-state imaging device according to claim 12, wherein:

the processor performs the digital-to-digital re-conversion for the minimum AD conversion code and the maximum AD conversion code by using a correction coefficient related to the FWC information for each pixel of the digital region.

14. The solid-state imaging device according to claim 2, wherein:

the FWC information is measured from a result obtained by performing the first comparison processing and then performing the second comparison processing using a ramp shaped reference voltage which is not modulated, in an on line state where the solid-state imaging device is normally operating.

15. The solid-state imaging device according to claim 2, wherein:

the FWC information is information measured in advance by driving the pixels in an off line state where the solid-state imaging device is not normally operating.

16. The solid-state imaging device according to claim 1, wherein:

the comparator, in the first comparison processing, outputs the first comparison result signal corresponding to a time in accordance with a quantity of the overflow charge and handles a light level from a signal level of the photodiode in a maximum sampling time at which the overflow charge begins to overflow from the photodiode to the output node to a signal level obtained in a minimum sampling time.

17. The solid-state imaging device according to claim 1, wherein:

the integration period is a period from when the photodiode and the output node are reset to a reset level to when the transistor is switched to a conductive state and the transfer period is started, a period of the first comparison processing is a period from when the photodiode and the output node are reset to the reset level to when the output node is reset to the reset level before the transfer period is started, and a period of the second comparison processing is a period after the output node is reset to the reset level and is a period including the period after the transfer period.

18. The solid-state imaging device according to claim 1, wherein:

the device includes a first substrate and a second substrate, the first substrate and the second substrate have a stacked structure where these substrates are connected through a connection part, at least the photodiode, the transistor, the output node, and the output buffer circuit in the pixel are formed on the first substrate, and at least the comparator, the memory part, and at least a portion of the reading circuit are formed on the second substrate.

19. A method for driving a solid-state imaging device having a pixel part in which pixels for performing photoelectric conversion are arranged, a reading circuit which reads out pixel signals from the pixels in the pixel part, and a processor which combines a plurality of read-out signals to generate a combined signal having an expanded dynamic range, wherein each pixel includes a photodiode which accumulates a charge generated by photoelectric conversion in an integration period, a transistor capable of transferring the charge accumulated in the photodiode in a transfer period after the integration period, an output node to which the charge accumulated in the photodiode is transferred through the transistor, an output buffer circuit which converts the charge at the output node to a voltage signal corresponding to a quantity of the charge and outputs the converted voltage signal, a comparator which performs comparison processing for comparing the voltage signal of the output buffer circuit and a reference voltage and outputting a digitized comparison result signal, and a memory part for storing data corresponding to the comparison result signal of the comparator, the method for driving a solid-state imaging device comprising:

when reading out pixel signals of the pixels, by means of the comparator, under control of the reading circuit, performing a first comparison processing for outputting a digitized first comparison result signal with respect to the voltage signal corresponding to an overflow charge overflowing from the photodiode to the output node in the integration period, and performing a second comparison processing for outputting a digitized second comparison result signal with respect to the voltage signal corresponding to the accumulated charge of the photodiode transferred to the output node in the transfer period after the integration period, and by means of the processor, performing combinational processing for joining a first analog-to-digital (AD) conversion transfer curve corresponding to the first comparison processing and a second AD conversion transfer curve corresponding to the second comparison processing.

20. An electronic apparatus, comprising a solid-state imaging device and a lens for forming a subject image in the solid-state imaging device, wherein the solid-state imaging device has a pixel part in which pixels for performing photoelectric conversion are arranged, a reading circuit which reads out pixel signals from the pixels in the pixel part, and a processor which combines a plurality of read-out signals to generate a combined signal having an expanded dynamic range, each pixel includes a photodiode which accumulates a charge generated by photoelectric conversion in an integration period, a transistor capable of transferring the charge accumulated in the photodiode in a transfer period after the integration period, an output node to which the charge accumulated in the photodiode is transferred through the transistor, an output buffer circuit which converts the charge at the output node to a voltage signal corresponding to a quantity of the charge and outputs the converted voltage signal, a comparator which performs comparison processing for comparing the voltage signal of the output buffer circuit and a reference voltage and outputting a digitized comparison result signal, and a memory part for storing data corresponding to the comparison result signal of the comparator, the comparator, under control of the reading circuit, performs a first comparison processing for outputting a digitized first comparison result signal with respect to the voltage signal corresponding to an overflow charge overflowing from the photodiode to the output node in the integration period, and performs a second comparison processing for outputting a digitized second comparison result signal with respect to the voltage signal corresponding to the accumulated charge of the photodiode transferred to the output node in the transfer period after the integration period, and the processor performs combinational processing for joining a first analog-to-digital (AD) conversion transfer curve corresponding to the first comparison processing and a second AD conversion transfer curve corresponding to the second comparison processing.

* * * * *